(12) United States Patent
Yoneshima

(10) Patent No.: US 8,451,688 B2  
(45) Date of Patent: May 28, 2013

(54) METHODS AND APPARATUS TO COMBINE MONOPOLE AND MULTIPOLE ACOUSTIC LOGGING MEASUREMENTS TO DETERMINE SHEAR SLOWNESS

(75) Inventor: Shinji Yoneshima, Kanagawa-ken (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 932 days.

(21) Appl. No.: 12/554,986

(22) Filed: Sep. 8, 2009

(65) Prior Publication Data
US 2011/0058451 A1 Mar. 10, 2011

(51) Int. Cl.
*G01V 1/30* (2006.01)
*G01V 1/28* (2006.01)

(52) U.S. Cl.
CPC .......... *G01V 1/284* (2013.01); *G01V 2210/622* (2013.01); *G01V 2210/47* (2013.01)
USPC .............................................. 367/75; 367/56

(58) Field of Classification Search
USPC .................. 367/31, 56, 57, 75; 702/11, 18
IPC ........................................ G01V 1/36,1/37, 1/48
See application file for complete search history.

(56) References Cited

U.S. PATENT DOCUMENTS

| | | | |
|---|---|---|---|
| 4,543,648 A | 9/1985 | Hsu | |
| 4,594,691 A | 6/1986 | Kimball et al. | |
| 5,278,805 A | 1/1994 | Kimball | |
| 5,661,696 A | 8/1997 | Kimball et al. | |
| 6,308,137 B1 | 10/2001 | Underhill et al. | |
| 6,366,531 B1 * | 4/2002 | Varsamis et al. | 367/26 |
| 6,449,560 B1 | 9/2002 | Kimball | |
| 7,639,563 B2 * | 12/2009 | Wu et al. | 367/35 |
| 2003/0206488 A1 * | 11/2003 | Blanch et al. | 367/38 |
| 2006/0016592 A1 * | 1/2006 | Wu | 166/250.07 |
| 2006/0120217 A1 | 6/2006 | Wu et al. | |
| 2008/0319675 A1 * | 12/2008 | Sayers | 702/11 |
| 2009/0067286 A1 * | 3/2009 | Bose et al. | 367/38 |
| 2009/0236145 A1 * | 9/2009 | Bennett et al. | 175/24 |
| 2009/0257307 A1 * | 10/2009 | Valero et al. | 367/31 |
| 2010/0085835 A1 * | 4/2010 | Tang et al. | 367/32 |

FOREIGN PATENT DOCUMENTS

EP 0147 316 B1 10/1991

OTHER PUBLICATIONS

P. Breton et al. "Well Positioned Seismic Measurements," Oilfield Review, Spring, 2002, pp. 32-45.
Christopher V. Kimball, "Shear Slowness Measurement by Dispersive Processing of the Borehole Flexural Mode," Geophysics, vol. 63, No. 2, Mar.-Apr. 1998, pp. 337-344.

(Continued)

*Primary Examiner* — Mark Hellner
*Assistant Examiner* — Ari M Diacou
(74) *Attorney, Agent, or Firm* — Jianguang Du; Brigitte Jeffery Echols

(57) ABSTRACT

Methods and apparatus to combine monopole and multipole acoustic logging measurements to determine shear slowness are disclosed. An example method to determine shear slowness of a formation from acoustic logging data disclosed herein comprises determining a plurality of mixed coherence values corresponding to a respective plurality of possible shear slowness values, each mixed coherence value determined by combining a monopole coherence value determined from monopole logging data and a multipole coherence value determined from multipole logging data, the monopole and multipole coherence values each being determined for a particular possible shear slowness value corresponding to the mixed coherence value, and using the particular shear slowness value corresponding to a maximum mixed coherence value in the plurality of mixed coherence values to represent the shear slowness of the formation.

19 Claims, 12 Drawing Sheets

OTHER PUBLICATIONS

Christopher V. Kimball and David J. Scheibner, "Error Bars for Sonic Slowness Measurements," Geophysics, vol. 63, No. 2, Mar.-Apr. 1998, pp. 345-353.

Chaur-Jian Hsu and Bikash K. Sinha, "Mandrel Effects on the Dipole Flexural Mode in a Borehole," J. Acoust. Soc. Am, vol. 104, Oct. 1998, pp. 2025-2039.

Andrew L. Kurkjian and Shu-Kong Chang, "Acoustic Multipole Sources in Fluid-Filled Boreholes," Geophysics, vol. 51, No. 1, Jan. 1986, pp. 148-163.

Christopher V. Kimball and Thomas L. Marzetta, "Semblance Processing of Borehole Acoustic Array Data," Geophysics, vol. 49, No. 3, Mar. 1984, pp. 274-281.

* cited by examiner

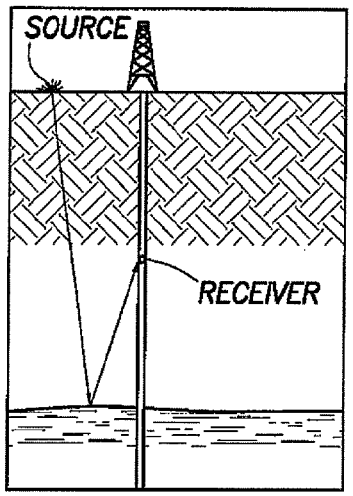 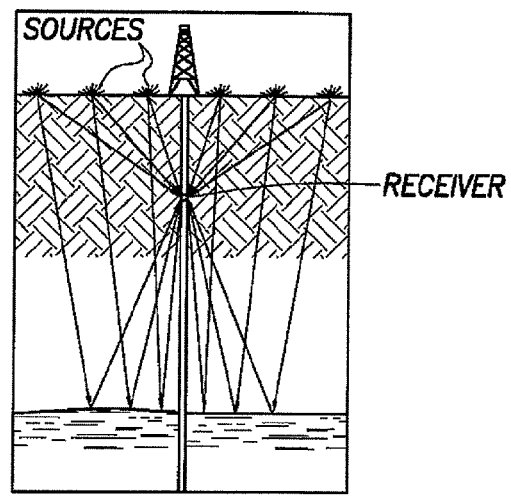
FIG. 2A  FIG. 2B
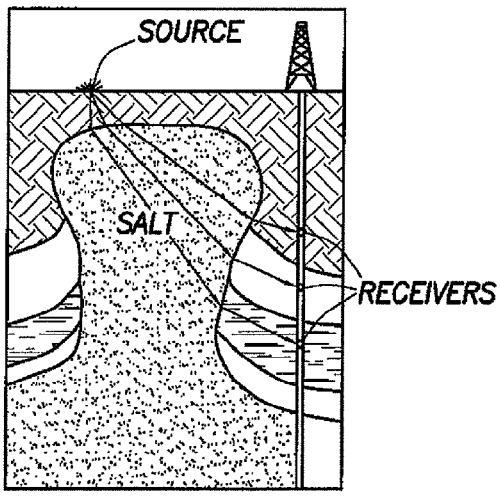 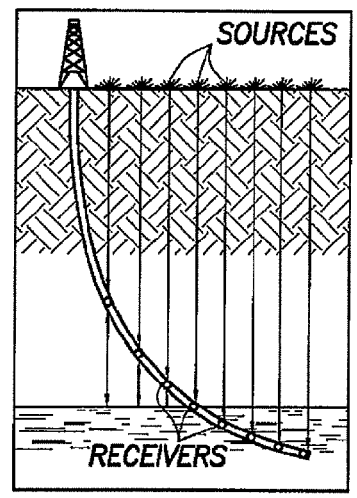
FIG. 2C  FIG. 2D

DTc/DTs/Rhob/DTm/Rhom/BHD=80/140/2.2/200/1.0/6.5

DTc/DTs/Rhob/DTm/Rhom/BHD=120/210/2.1/200/1.0/6.5

METHODS AND APPARATUS TO COMBINE MONOPOLE AND MULTIPOLE ACOUSTIC LOGGING MEASUREMENTS TO DETERMINE SHEAR SLOWNESS

FIELD OF THE DISCLOSURE

This disclosure relates generally to acoustic logging and, more particularly, to methods and apparatus to combine monopole and multipole acoustic logging measurements to determine shear slowness.

BACKGROUND

Logging while drilling tools employing various acoustic measurement techniques are routinely suspended in a borehole and used to measure characteristics of the surrounding formation. Shear slowness, which is the inverse of shear wave velocity, is one such formation characteristic of interest. Examples of acoustic measurement techniques include monopole acoustic logging and multipole acoustic logging. Monopole acoustic logging utilizes a monopole acoustic source to generate, among other things, nondispersive shear head waves that can be measured to determine shear slowness. However, monopole acoustic logging yields meaningful shear slowness measurements only in fast formations in which shear slowness is less than mud slowness (also known as the borehole fluid slowness) and, thus, in which nondispersive shear head waves can propagate.

Multipole acoustic logging utilizes multipole acoustic sources, such as dipole or quadrupole acoustic sources, to generate dispersive waves that can be processed to determine shear slowness. Because it does not rely on propagating shear head waves, multipole acoustic logging can be used to measure characteristics of both fast formations and slow formations. However, multipole acoustic logging, such as quadrupole logging in a logging while drilling (LWD) application, can be relatively insensitive to shear slowness variations in fast formations. Thus, under at least some circumstances, multipole acoustic logging can yield relatively less reliable shear slowness measurements in fast formations than in slow formations.

SUMMARY

In an example embodiment disclosed herein, a method to determine shear slowness of a formation from acoustic logging data includes determining a plurality of mixed coherence values corresponding to a respective plurality of possible shear slowness values. Each such mixed coherence value is determined by combining a monopole coherence value determined from monopole logging data and a multipole coherence value determined from multipole logging data, with the monopole and multipole coherence values each being determined for a particular possible shear slowness value corresponding to the mixed coherence value. The example method also includes using the particular shear slowness value corresponding to a maximum mixed coherence value in the plurality of mixed coherence values to represent the shear slowness of the formation. Furthermore, in an example implementation, particular monopole and multipole coherence values are combined according to their respective standard deviations to form a corresponding mixed coherence value. Additionally or alternatively, weighting factors are used to exclude coherence values corresponding to formation parameter combinations that are not physically realizable.

In another example embodiment disclosed herein, a tangible article of manufacture stores machine readable instructions which, when executed, cause a machine to combine a first monopole coherence value determined from monopole logging data and a first multipole coherence value determined from multipole logging data to determine a first mixed coherence value, with the first monopole coherence value and the first multipole coherence value corresponding to a first shear slowness value. The example machine readable instructions, when executed, also cause the machine to combine a second monopole coherence value determined from the monopole logging data and a second multipole coherence value determined from the multipole logging data to determine a second mixed coherence value, with the second monopole coherence value and the second multipole coherence value corresponding to a second shear slowness value. Furthermore, the example machine readable instructions, when executed, cause the machine to use the first shear slowness value to represent shear slowness of a formation when the first mixed coherence value is greater than the second mixed coherence value, but instead use the second shear slowness value to represent the shear slowness of the formation when the second mixed coherence value is greater than the first mixed coherence value. Additionally, in an example implementation, the first monopole and first multipole coherence values are combined according to their respective standard deviations to form the first mixed coherence value, with further weighting factors being used to exclude coherence values corresponding to formation parameter combinations that are not physically realizable In still another example embodiment disclosed herein, an example apparatus to determine shear slowness of a formation from acoustic logging data includes a logging measurement collector to communicatively couple with a logging while drilling tool to obtain monopole logging data and multipole logging data corresponding to a measured formation. The example apparatus also includes a coherence combiner to combine a monopole coherence value determined from the monopole logging data for a particular formation parameter combination and a multipole coherence value determined from the multipole logging data for the particular formation parameter combination to yield a mixed coherence value for the particular formation parameter combination. The particular combination of formation parameters includes a particular shear slowness value. Furthermore, the example apparatus includes a combined coherence maximizer to identify a maximum mixed coherence value from a plurality of mixed coherence values determined by the coherence combiner for a respective plurality of formation parameter combinations, with the combined coherence maximizer to provide a shear slowness measurement output substantially equal to the particular shear slowness value included in the particular combination of formation parameters corresponding to the identified maximum mixed coherence value.

BRIEF DESCRIPTION OF THE DRAWINGS

FIGS. 2A-D are a block diagram illustrating example seismic-while-drilling tools that may be used to implement the wellsite system of FIG. 1.

DETAILED DESCRIPTION

Figure 1:
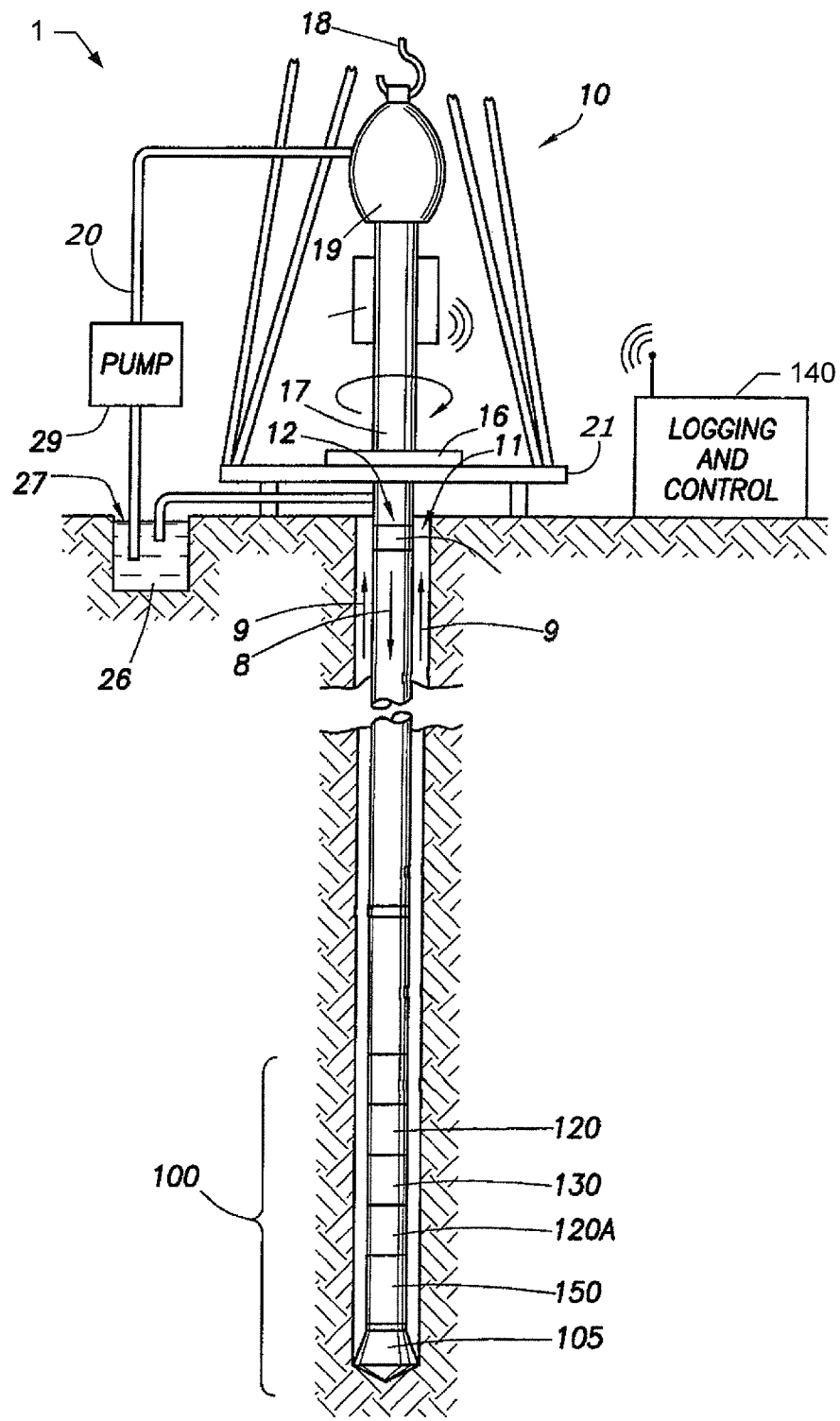
FIG. 1 is a block diagram illustrating an example wellsite system capable of combining monopole and multipole acoustic logging measurements to determine shear slowness.

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the disclosure.

As mentioned above, determining shear slowness of a formation is often an important goal of logging while drilling (LWD) acoustic processing. In a typical LWD configuration, one of two types of acoustic waves are measured to determine shear slowness—shear head waves generated via a monopole high frequency source and quadrupole mode waves generated via a quadrupole acoustic source. Shear slowness, which is the inverse of shear wave velocity, can be determined directly from the shear head waveforms derived from the monopole acoustic data collected via monopole acoustic logging. However, as mentioned above, shear head waves propagate in fast formations in which shear slowness is less than mud slowness (also known as the borehole fluid slowness), but not in slow formations in which shear slowness is greater than mud slowness. Therefore, monopole acoustic logging can be used to determine shear slowness in fast formations, but not slow formations.

Shear slowness can also be determined indirectly from quadrupole mode waves by inverting a dispersion model representing the dispersive characteristic of the quadrupole mode waves. The dispersion model is a function of many formation parameters, including shear slowness and mud slowness. Unlike shear head waves, the quadrupole mode waves generated during quadrupole acoustic logging propagate in both fast and slow formations. Thus, the quadrupole mode waves can be used to determine shear slowness (and mud slowness) for both fast and slow formations via dispersion model inversion. However, quadrupole acoustic logging, especially in an LWD application, can be relatively insensitive to shear slowness variations in fast formations and, thus, can yield relatively less reliable shear slowness measurements in fast formations than in slow formations.

In other words, monopole acoustic logging can determine reliable shear slowness measurements in fast formations, but not slow formations. Conversely, quadrupole acoustic logging or, more generally, multipole acoustic logging can yield reliable shear slowness measurements in slow formations, but can yield relatively less reliable measurements in fast formations under at least some circumstances. As such, many existing acoustic logging techniques fail to yield reliable shear slowness measurements across both fast and slow formations.

Unlike many existing acoustic logging techniques, the example methods and apparatus described herein are able to determine reliable shear slowness measurements across both fast and slow formations. In formations that are homogeneously isotropic (e.g., formations in which acoustic waves propagate uniformly in all directions), shear slowness measured via monopole logging and shear slowness measured via quadrupole logging should be substantially the same. As such, the example acoustic logging methods and apparatus described herein obtain shear slowness measurements by statistically combining shear slowness measurements determined via monopole logging and corresponding shear slowness measurements determined via quadrupole logging. For example, because monopole and quadrupole shear slowness measurements are expected to be substantially the same in a homogeneously isotropic formation, any difference between the respective shear slowness measurements is likely due to the measurement error, which may be characterized by a variance or standard deviation associated with each of the two measurement techniques. Accordingly, the example methods and apparatus described herein take such measurement errors into account when statistically combining shear slowness measurements determined via monopole logging and corresponding shear slowness measurements determined via quadrupole logging to determine overall shear slowness measurements.

In an example implementation of the acoustic logging techniques described herein, monopole coherence values (also referred to as nondispersive coherence values) are determined from the monopole logging data for a set of possible shear slowness values. Multipole coherence values (also referred to as dispersive coherence values) are also determined from the quadrupole logging data for the set of possible shear slowness values. The monopole and multipole coherence values corresponding to the same possible shear slowness value (as well as the same combination of other formation parameters) are combined after weighting according to their respective measurement error, which may be represented by respective measurement variances or, equivalently, standard deviations. The monopole and multipole coherence values may also be weighted by other weight factors to cause coherence values corresponding to possible shear slowness values that are not physically realizable in the formation to be excluded from the combining procedure. After combining the monopole and multipole coherence values to form mixed coherence values for the set of possible shear slowness values, the maximum mixed coherence value is identified. The possible shear slowness value corresponding to the maximum mixed coherence is then determined to be the estimated shear slowness for the formation at the particular location (e.g., borehole depth) corresponding to the monopole and quadrupole logging data. By determining the shear slowness to be the value that maximizes the mixed coherence, the acoustic logging techniques described herein identify the shear slowness that best accounts for both the monopole and quadrupole logging measurements. In this way, the described acoustic logging techniques can be used to generate shear slowness logs from fast to slow formations, and also slow to fast formations.

Coherence, also referred to as semblance, is a metric that can be computed from acoustic logging data to determine shear slowness, as well as other formation parameters, such as compressional slowness (which is the inverse of compressional wave velocity), mud slowness, etc. As described in greater detail below, acoustic logging data includes receiver waveform data representative of acoustic waveforms detected by multiple receivers included in an LWD receiver array. Coherence is determined, in part, by backpropagating the receiver waveforms in an attempt to undo the delay and dispersion characteristics exhibited by the waveforms as the measured acoustic waves propagate along the receiver array. Coherence is maximized when the receiver waveforms are backpropagated in a manner that actually does undo (or, in other words, inverts) the delay and dispersion characteristics of the waveforms across the receiver array.

For example, in the case of monopole logging, the nondispersive shear head waves measured by the receiver array can be backpropagated by shifting the receiver waveforms by a delay related to the shear slowness. Thus, monopole coherence is maximized when the delay used for backpropagation corresponds to the true shear slowness of the formation. In the case of quadrupole logging, the dispersive shear headwaves measured by the receiver array can be backpropagated by shifting the receiver waveforms based on a dispersion model that is a function of the formation parameters, including shear slowness. Similar to monopole coherence, quadrupole coherence is maximized when the formation parameters, including shear slowness, of the dispersion model used for backpropagation correspond to the true formation parameters.

The example acoustic logging techniques described herein operate to determine a shear slowness, as well as other formation parameters, that maximizes mixed coherence, which is a combination of monopole coherence and quadrupole or, more generally, multipole coherence. The shear slowness value maximizing mixed coherence can be viewed as the shear slowness value that yields a best trade-off of attempting to maximize monopole coherence and quadrupole coherence while taking into account the relative measurement error (e.g., variance or standard deviation) associated with these two metrics. As such, the shear slowness value maximizing mixed coherence provides an accurate measurement of shear slowness in fast formations where monopole logging and the resulting monopole coherence are accurate, as well as and slow formations where quadrupole logging and the resulting quadrupole coherence are accurate.

Although example methods and apparatus are described in the context of combining monopole and quadrupole acoustic logging, the example methods and apparatus are not limited to combining monopole and quadrupole acoustic logging. Instead, the example methods and apparatus described herein are applicable to combining monopole logging and any type of multipole logging, including quadrupole logging, dipole logging, etc. Thus, unless otherwise indicated, the term quadrupole logging is considered to be synonymous with the term multipole logging in the description provided herein.

Furthermore, the example acoustic logging methods and apparatus disclosed herein are not limited to processing acoustic data from any particular type of logging technology. For example, although the example acoustic logging methods and apparatus disclosed herein are described in the context of processing LWD acoustic data, these example methods and apparatus could also be used to process acoustic data obtained via wireline logging or any other type of logging technique, such as measurement while drilling (MWD), logging while tripping (LWT), etc.

Turning to the figures, FIG. 1 illustrates an example wellsite system 1 in which the example acoustic logging methods and apparatus described herein can be employed. The wellsite can be onshore or offshore. In this exemplary system, a borehole 11 is formed in subsurface formations by rotary drilling, whereas other example systems can use directional drilling.

A drillstring 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. In an example, the drill string 12 is suspended from a lifting gear (not shown) via the hook 18, with the lifting gear being coupled to a mast (not shown) rising above the surface. An example lifting gear includes a crown block whose axis is affixed to the top of the mast, a vertically traveling block to which the hook 18 is attached, and a cable passing through the crown block and the vertically traveling block. In such an example, one end of the cable is affixed to an anchor point, whereas the other end is affixed to a winch to raise and lower the hook 18 and the drillstring 12 coupled thereto. The drillstring 12 is formed of drill pipes screwed one to another.

The drillstring 12 may be raised and lowered by turning the lifting gear with the winch. In some scenarios, drill pipe raising and lowering operations require the drillstring 12 to be unhooked temporarily from the lifting gear. In such scenarios, the drillstring 12 can be supported by blocking it with wedges in a conical recess of the rotary table 16, which is mounted on a platform 21 through which the drillstring 12 passes.

In the illustrated example, the drillstring 12 is rotated by the rotary table 16, energized by means not shown, which engages the kelly 17 at the upper end of the drillstring 12. The drillstring 12 is suspended from the hook 18, attached to a traveling block (also not shown), through the kelly 17 and the rotary swivel 19, which permits rotation of the drillstring 12 relative to the hook 18. A top drive system could alternatively be used.

In the illustrated example, the surface system further includes drilling fluid or mud 26 stored in a pit 27 formed at the well site. A pump 29 delivers the drilling fluid 26 to the interior of the drillstring 12 via a hose 20 coupled to a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 includes one or more specially-made drill collars near the drill bit 105. Each such drill collar has one or more logging devices mounted on or in it, thereby allowing downhole drilling conditions and/or various characteristic properties of the geological formation (e.g., such as layers of rock or other material) intersected by the borehole 11 to be measured as the borehole 11 is deepened. In particular, the bottom hole assembly 100 of the illustrated example system 1 includes a logging-while-drilling (LWD) module 120, a measuring-while-drilling (MWD) module 130, a roto-steerable system and motor 150, and the drill bit 105.

Figure 3:
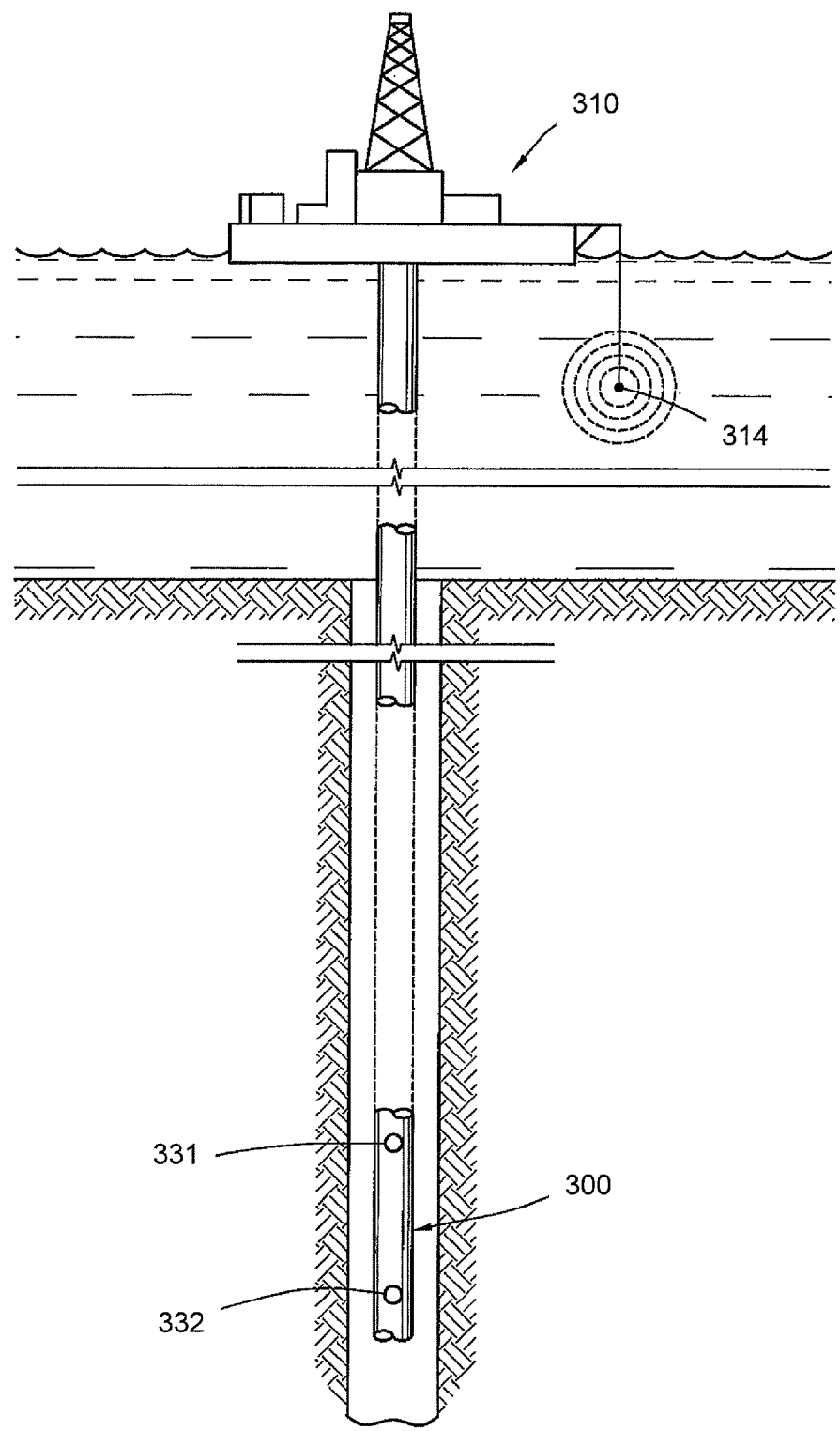
FIG. 3 is a block diagram illustrating an example sonic-while-drilling tool that may be used to implement the wellsite system of FIG. 1.

The LWD module 120 is housed in a drill collar and can contain one or a plurality of logging tools. It will also be understood that more than one LWD and/or MWD module can be employed, e.g. as represented at 120A. (References, throughout, to a module at the position of 120 can alternatively mean a module at the position of 120A as well.) The LWD module 120 includes capabilities for measuring, processing, and storing information, as well as for communicating with the surface equipment. In an example implementation, the LWD module 120 includes a seismic measuring device, examples of which are illustrated in FIGS. 2A-D and described in greater detail below. In another example implementation, the LWD module 120 includes a sonic measuring device, an example of which is illustrated in FIG. 3 and described in greater detail below.

The MWD module 130 is also housed in a drill collar and can contain one or more devices for measuring characteristics of the drillstring 12 and drill bit 105. The MWD module 130 further includes an apparatus (not shown) for generating electrical power to the downhole system. This may typically include a mud turbine generator powered by the flow of the drilling fluid, it being understood that other power and/or battery systems may be employed. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

Figure 6:
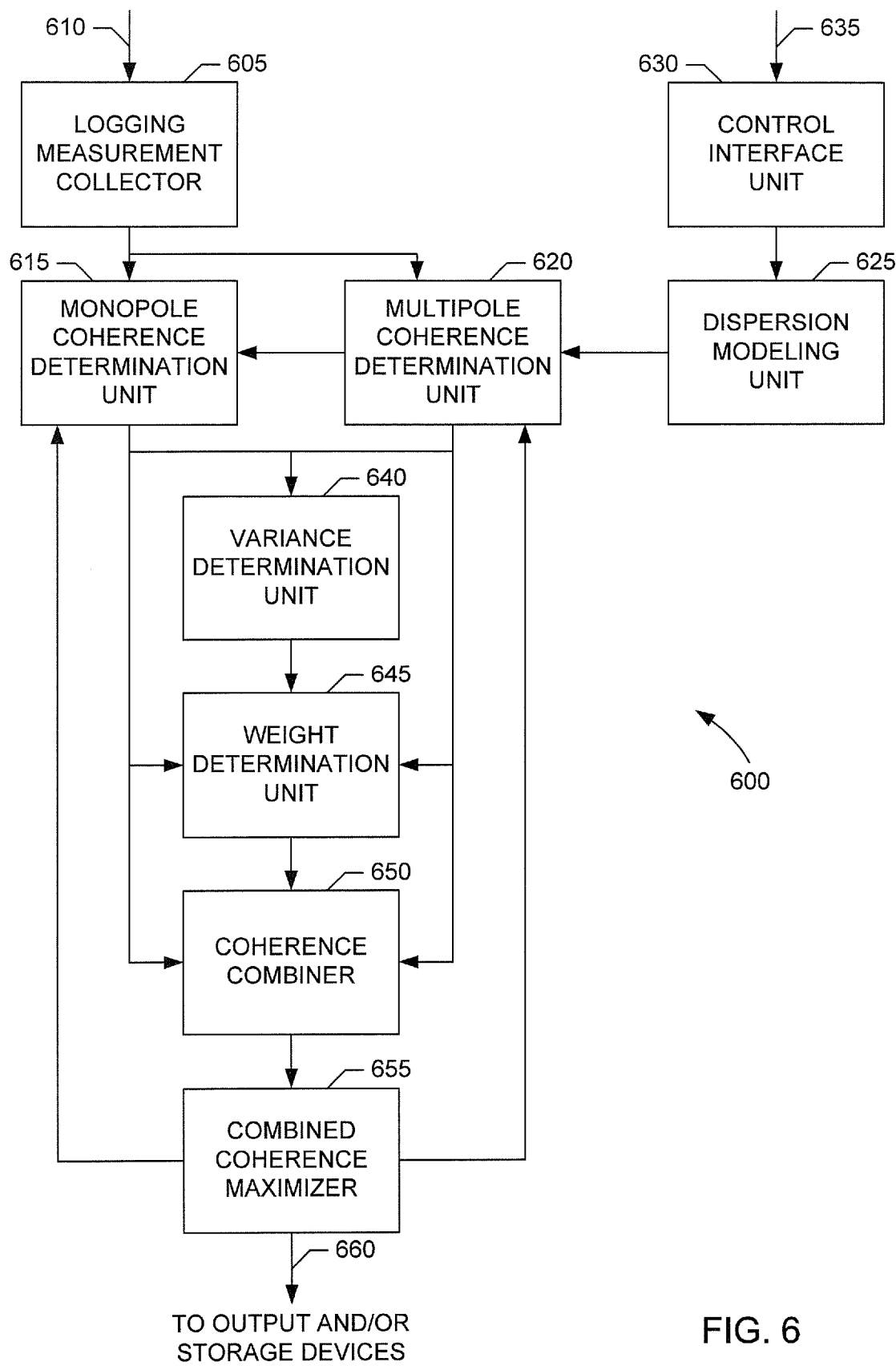
FIG. 6 illustrates an example logging unit to combine monopole and multipole acoustic logging measurements to determine shear slowness that may be used to implement the wellsite system of FIG. 1.

The wellsite system 1 also includes a logging and control unit 140 communicably coupled in any appropriate manner to the LWD module 120/120A and the MWD module 130. In the illustrated example, the logging and control unit 140 implements the example acoustic logging methods and apparatus described herein to determine shear slowness (as well as other formation parameters) from monopole and multipole (e.g., quadrupole) acoustic logging data obtained from the LWD modules 120 and/or 120A. An example logging unit that may be used to implement the logging and control unit 140 is illustrated in FIG. 6 and described in greater detail below.

FIGS. 2A-D illustrate example seismic-while-drilling tools that can be the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD module 120/120A can have a single receiver (as depicted in FIGS. 2A and 2B), or multiple receivers (as depicted in FIGS. 2C and 2D), and can be employed in conjunction with a single seismic source at the surface (as depicted in FIGS. 2A and 2C) to support monopole acoustic logging or plural seismic sources at the surface (as depicted in FIGS. 2B and 2D) to support multipole acoustic logging. Accordingly, FIG. 2A, which includes reflection off a bed boundary, and is called a "zero-offset" vertical seismic profile arrangement, uses a single source and a single receiver; FIG. 2B, which includes reflections off a bed boundary, and is called a "walkaway" vertical seismic profile arrangement, uses multiple sources and a single receiver; FIG. 2C, which includes refraction through salt dome boundaries, and is called a "salt proximity" vertical seismic profile, uses a single source and multiple receivers; and FIG. 2D, which includes some reflections off a bed boundary, and is called a "walk above" vertical seismic profile, uses multiple sources and multiple receivers.

FIG. 3 illustrates a sonic logging-while-drilling tool that can be the LWD tool 120, or can be a part of an LWD tool suite 120A of the type described in U.S. Pat. No. 6,308,137, incorporated herein by reference. In the illustrated example of FIG. 3, an offshore rig 310 is employed, and a sonic transmitting source or array 314 is deployed near the surface of the water. Alternatively, any other suitable type of uphole or downhole source or transmitter can be provided. An uphole processor controls the firing of the transmitter 314. The uphole equipment can also include acoustic receivers and a recorder for capturing reference signals near the source. The uphole equipment further includes telemetry equipment for receiving MWD signals from the downhole equipment. The telemetry equipment and the recorder are coupled to a processor so that recordings may be synchronized using uphole and downhole clocks. The downhole LWD module 300 includes at least acoustic receivers 331 and 332, which are coupled to a signal processor so that recordings may be made of signals detected by the receivers in synchronization with the firing of the signal source.

Figure 4:
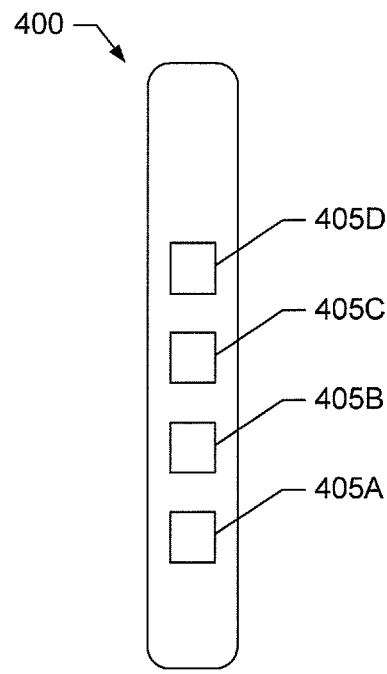
FIG. 4 illustrates an example receiver array that may be used to implement a seismic-while-drilling tool or a sonic-while-drilling for use in the wellsite system of FIG. 1.

An example receiver array 400 that may be included in the example LWD tool 120 and/or 120A of FIGS. 1, 2 and/or 3 is illustrated in FIG. 4. The receiver array 400 of the illustrated example includes four acoustic receivers 405A-D. However, more or fewer receivers could be included in the receiver array 400. Each receiver 405A-D is configured to detect acoustic waves generated by one or more acoustic sources (not shown) and that propagate in a formation penetrated by a borehole in which the receiver array 400 is placed. The acoustic waveforms detected by the receivers 405A-D are staggered in time due to the spacing between the receivers 405A-D. For example, in the case of a monopole acoustic source, the receivers 405A-D detect monopole headwaves, including shear head waves, if present, that are nondispersive and, thus, the waveforms determined by each receiver are substantially similar except for a time delay. However, in the case of a quadrupole acoustic source, the receivers 405A-D detect quadrupole mode waves that are dispersive and, thus, the waveforms determined by each receiver may appear different. Examples of acoustic waveforms detected by the receivers 405A-D are depicted in FIG. 5.

Figure 5:
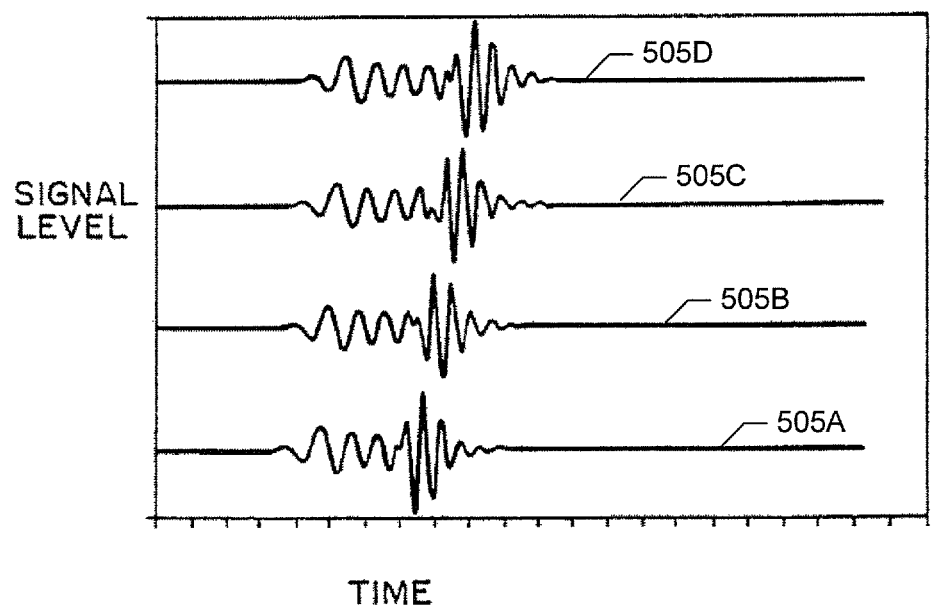
FIG. 5 illustrates example receiver waveforms that may be determined from logging measurements obtained by the wellsite system of FIG. 1 using the receiver array of FIG. 4.

FIG. 5 depicts four example acoustic waveforms 505A-D corresponding respectively to the receivers 405A-D included in the receiver array 400 of FIG. 4. The acoustic waveforms 505A-D are each offset in time relative to each other due to the spacing between the receivers 405A-D. Additionally, the illustrated example waveforms 505A-D are dispersive as suggested by their different relative appearances.

In an example implementation, the acoustic logging techniques described herein determine monopole coherence (semblance) and multipole coherence (semblance) from respective monopole logging measurement data and multipole logging measurement data detected by the acoustic receivers 405A-D. The disclosed acoustic logging techniques combine monopole and multipole coherence to determine mixed coherence, from which overall shear slowness measurements can be determined over both fast and slow formations.

In such an example implementation, coherence is determined by, in part, backpropagating the receiver waveforms 505A-D in an attempt to undo the delay and dispersion characteristics exhibited by the waveforms as the measured acoustic waves propagate along the receiver array 400 (FIG. 4). If the receiver waveforms 505A-D correspond to nondispersive shear head waves detected during monopole acoustic logging, backpropagation to determine monopole coherence involves compensating for the delay between the detected receiver waveforms 505A-D to yield backcompensated waveforms aligned in time, with the delay between adjacent waveforms being directly related to shear slowness. In monopole acoustic logging, the shear slowness value yielding a maximum monopole coherence value is considered a best estimate of the actual slowness of the formation.

In the illustrative example of FIG. 5 in which the receiver waveforms 505A-D correspond to dispersive quadrupole mode waves detected during quadrupole acoustic logging, backpropagation to determine multipole coherence involves compensating for both the delay and the dispersive characteristics of the detected receiver waveforms 505A-D to yield backcompensated waveforms aligned in time and that are substantially similar in appearance. As discussed above, such backpropagation of dispersive quadrupole-mode waves is achieved by shifting the receiver waveforms 505A-D based on a dispersion model that is a function of the formation parameters, including shear slowness. In quadrupole acoustic logging, the shear slowness value (in combination with the other formation parameters of the dispersion model) yielding a maximum quadrupole coherence value is considered a best estimate of the actual slowness of the formation. As noted above and discussed in greater detail below, the example acoustic logging techniques disclosed herein determine an overall shear slowness value (as well as other formation parameter values) that maximizes mixed coherence, which is a weighted combination of monopole coherence and quadrupole (or, more generally, multipole) coherence.

A block diagram of an example logging unit 600 that may be used to implement the acoustic logging methods and apparatus disclosed herein in the logging and control unit 140 of FIG. 1 is illustrated in FIG. 6. As an overview, the logging unit 600 of FIG. 6 obtains monopole and multipole (e.g., quadrupole) logging data detected, for example, by the receiver array 400 included in the LWD 120 or 120A. The logging unit 600 determines monopole coherence from the collected monopole logging data and multipole coherence from the collected multipole logging data. The logging unit 600 subsequently determines mixed coherence by statistically combining the monopole and multipole coherence according to their respective measurement errors (e.g., such as variance or standard deviation). Then, the logging unit 600 determines an overall shear slowness value that maximizes mixed coherence.

Turning to FIG. 6, the logging unit 600 includes a logging measurement collector 605 to communicatively couple to the receiver array 400 included in the LWD 120/120A using a logging data interface 610. The logging data interface 610 can be implemented by any wireless or wireline connection, or combination thereof, to the LWD 120/120A. The logging measurement collector 605 can be implemented by any data collection technique for representing and storing acoustic waveform data.

The logging unit 600 also includes a monopole coherence determination unit 615 to determine monopole coherence from monopole logging data collected by the logging measurement collector 605. The logging unit 600 further includes a multipole coherence determination unit 620 to determine multipole (e.g., quadrupole) coherence from multipole (e.g., quadrupole) logging data collected by the logging measurement collector 605. In support of the multipole coherence determination unit 620, the logging unit 600 also includes a dispersion modeling unit 625 and a control interface unit 630.

As described in greater detail below, the dispersion modeling unit 625 operates to evaluate one or more dispersion models to be used by the multipole coherence determination unit 620 to backpropagate the multipole (e.g., quadrupole) mode waveforms obtained by the logging measurement collector 605 to determine multipole coherence. The control interface unit 630 operates to obtain one or more input (e.g., fixed) formation parameters to be used by the dispersion modeling unit 625 to evaluate the one or more dispersion models.

In an example implementation, the logging unit 600 operates to determine mixed coherence, $coh_{mixed}$, (also referred to as mixed semblance) according to Equation 1 below.

$$coh_{mixed} = \frac{coh_{mono}/\sigma_{mono} + coh_{quad}/\sigma_{quad}}{1/\sigma_{mono} + 1/\sigma_{quad}} \quad \text{Equation 1}$$

In Equation 1, $coh_{mono}$ and $coh_{quad}$ represent monopole coherence and multipole coherence, respectively, and $\sigma_{mono}$ and $\sigma_{quad}$ represent the standard deviation of the respective monopole coherence and multipole coherence. Accordingly, the monopole coherence determination unit 615 operates to determine values of $coh_{mono}$ for different possible shear slowness values used to backpropagate the monopole receiver waveforms represented by the monopole logging data collected by the logging measurement collector 605. Similarly, the multipole coherence determination unit 620 operates to determine values of $coh_{quad}$ for different possible shear slowness and other formation parameter values (e.g., such as mud slowness) used by the dispersion model to backpropagate the multipole receiver waveforms represented by the multipole logging data collected by the logging measurement collector 605

For example, the multipole coherence determination unit 620 can be configured to implement any appropriate technique for computing multipole coherence (semblance). Example techniques for computing multipole coherence that may be implemented by the multipole coherence determination unit 620 include, but are not limited to, any, some or all of the techniques described in: (1) Kimball, "Shear Slowness Measurement by Dispersive Processing of the Borehole Flexural Mode," Geophysics, Vol. 63, No. 2, 337-344 (March-April 1998); (2) Kimball and Scheibner, "Error Bars for Sonic Slowness Measurements," Geophysics, Vol. 63, No. 2, 345-353 (March-April 1998); (3) U.S. Pat. No. 5,278,805, issued on Jan. 11, 1994, to Kimball; (4) U.S. Pat. No. 5,661,696, issued on Aug. 26, 1997, to Kimball et al.; and (5) U.S. Patent Publication No. 2006/0120217, published on Jun. 8, 2006, to Wu et al., all of which are hereby incorporated by reference in their respective entireties.

In an example implementation, the multipole coherence determination unit 620 processes the multipole receiver waveforms to compute the multipole coherence, $coh_{quad}$, for different possible shear slowness and other formation parameter values (e.g., such as mud slowness) using Equation 2 below.

$$coh_{quad}(S, S_M) = \frac{1}{N_r} \frac{\int |\Sigma s_i(f) e^{-j2\pi f \alpha(f, S, S_M)(i-1)\delta}|^2 df}{\Sigma \int |s_i(f)|^2 df} \quad \text{Equation 2}$$

In Equation 2, $coh_{quad}(S, S_M)$ is computed for different possible shear slowness values, S, and mud slowness values, $S_M$. Additionally, $N_r$ represents the number of receivers 405A-D included in the receiver array 400 and δ represents the spacing between each receiver 405A-D. The parameter $s_i(f)$ represents the frequency spectrum of the received multipole waveform at the $i^{th}$ receiver, and α represents the dispersion model used to backpropagate the receiver waveforms or, equivalently, the frequency spectrums $s_i(f)$ of the receiver waveforms detected by the receivers 405A-D. The summations in Equation 2 are over the number of receivers, $N_r$. Equation 2 corresponds to Equation (7) in "Shear Slowness Measurement by Dispersive Processing of the Borehole Flexural Mode" by Kimball and Equation (26) in U.S. Pat. No. 5,278,805 referenced above. Although Equation 2 assumes a uniform spacing δ between receivers 405A-D, Equation 2 can be readily modified to support non-uniform spacing as well.

The dispersion model α (also referred to as a dispersion curve, a dispersion function, etc.) employed in Equation 2 can be any dispersion model used to characterize the dispersive nature of acoustic signals across the receiver array 400. As such, the example methods and apparatus described herein are not limited to a particular dispersion model, such as the example dispersion models described in Hsu and Sinha, "Mandrel Effects on the Dipole Flexural Mode in a Borehole," J. Acoust. Soc. Am, Vol. 104, 2025-2039 (October 1998), and Kurkjian and Chang, "Acoustic Multipole Sources in Fluid-Filled Boreholes," Geophysics, Vol. 51, No. 1, 148-163 (January 1986), which are hereby incorporated by reference in their respective entireties. The dispersion model α is evaluated by the dispersion modeling unit 625 for a set of fixed formation parameters and a set of variable formation parameters. For example, U.S. Pat. No. 5,278,805 and U.S. Patent Publication No. 2006/0120217 each indicate that the dispersion model α can be represented as a function of several formation parameters. In other words, the dispersion model α can be represented by Equation 3 below.

$$\alpha = \alpha(f, S, S_M, S_C, \rho_b, \rho_m, HD), \quad \text{Equation 3}$$

In Equation 3, f represents frequency, S represents shear slowness, $S_M$ represents mud slowness, $S_C$ represents compressional slowness, $\rho_b$ represents formation density, $\rho_m$ represents mud (fluid) density and HD represents borehole diameter.

Depending upon a particular example implementation, one or more of the formation parameters in Equation 3 may be fixed, whereas the other formation parameters are variable such that multipole coherence can be determined for different possible values of the variable parameters. For example, in the technique described in U.S. Pat. No. 5,278,805, the formation parameters $S_M$, $S_C$, $\rho_b$, $\rho_m$ and HD (e.g., all the formation parameters except shear slowness, S) are assumed to be fixed, whereas shear slowness S is variable. However, in the example technique described in U.S. Patent Publication No. 2006/0120217, the formation parameters $S_C$, $\rho_b$, $\rho_m$ and HD are assumed to be fixed, whereas shear slowness S and mud slowness $S_M$ are assumed to be variable. The control interface unit 630 is configured to communicatively couple via any appropriate communication interface 635 to, for example, a computer terminal or other input device (not shown) to allow the fixed formation parameters to be specified by a system operator or other user. Additionally or alternatively, the control interface unit 630 can be configured to communicatively couple via the communication interface 635 to any other measurement equipment capable of determining one or more of the fixed formation parameters.

Similar to the multipole coherence determination unit 620, the monopole coherence determination unit 615 can be configured to implement any appropriate technique for computing monopole coherence (semblance). Example techniques for computing monopole coherence that may be implemented by the monopole coherence determination unit 620 include, but are not limited to, any, some or all of the techniques described in: (1) Kimball and Marzetta, "Semblance Processing of Borehole Acoustic Array Data," Geophysics, Vol. 49, No. 3, 274-281 (March 1984); (2) Kimball, "Shear Slowness Measurement by Dispersive Processing of the Borehole Flexural Mode," Geophysics, Vol. 63, No. 2, 337-344 (March-April 1998); (3) Kimball and Scheibner, "Error Bars for Sonic Slowness Measurements," Geophysics, Vol. 63, No. 2, 345-353 (March-April 1998); (4) U.S. Pat. No. 4,594,691, issued on Jun. 10, 1986, to Kimball et al.; (5) U.S. Pat. No. 5,278,805, issued on Jan. 11, 1994, to Kimball; (6) U.S. Pat. No. 5,661,696, issued on Aug. 26, 1997, to Kimball et al.; (7) U.S. Pat. No. 4,543,648, issued on Sep. 24, 1985 to Hsu and (8) European Patent Publication No. 0 147 316, published on Sep. 10, 1991, to Hsu, all of which are hereby incorporated by reference in their respective entireties.

In an example implementation, the monopole coherence determination unit 615 processes the monopole receiver waveforms to compute the monopole coherence, $coh_{mono}$, for different possible shear slowness and other formation parameter values (e.g., such as mud slowness) using Equation 4 below.

$$coh_{mono}(S, T) = \frac{1}{N_r} \frac{\int_T^{T+T_W} |\Sigma r_i[t + S(i-1)\delta]|^2 \, dt}{\Sigma \int_T^{T+T_W} |r_i[t + S(i-1)\delta]|^2 \, dt}. \quad \text{Equation 4}$$

Alternatively, Equation 5 below may be used.

$$coh_{mono}(S, T) = \frac{1}{N_r} \frac{\int_T^{T+T_W} |F^{-1}[\Sigma s_i(f) e^{-j2\pi f S(i-1)\delta}]|^2 \, dt}{\int_T^{T+T_W} |F^{-1}[s_i(f) e^{-j2\pi f S(i-1)\delta}]|^2 \, dt} \quad \text{Equation 5}$$

In Equation 4 and Equation 5, $coh_{mono}(S,T)$ is computed for different possible shear slowness values, S, and different measurement times, T. Additionally, as described above, $N_r$ represents the number of receivers 405A-D included in the receiver array 400 and δ represents the spacing between each receiver 405A-D. The parameter $s_i(f)$ represents the frequency spectrum of the received monopole waveform, $r_i(t)$, at the $i^{th}$ receiver. The parameter $T_W$ represents a configurable observation window. The summations in Equation 4 and Equation 5 are over the number of receivers, $N_r$. Equation 4 corresponds to Equation (3) in "Semblance Processing of Borehole Acoustic Array Data" by Kimball and Marzetta, Equation (2) in "Shear Slowness Measurement by Dispersive Processing of the Borehole Flexural Mode" by Kimball, a combination of Equations (3), (4) and (5) in U.S. Pat. No. 4,594,691, and Equation (21) in U.S. Pat. No. 5,278,805 referenced above. Equation 5 corresponds to Equation (4) in "Shear Slowness Measurement by Dispersive Processing of the Borehole Flexural Mode" by Kimball, and a combination of Equations (24) and (25) in U.S. Pat. No. 5,278,805 referenced above. Although Equation 4 and Equation 5 assume a uniform spacing δ between receivers 405A-D, Equation 4 and Equation 5 can each be readily modified to support non-uniform spacing as well.

Because the monopole receiver waveforms are nondispersive, backpropagating involves shifting each receiver waveform $r_i(t)$ or corresponding frequency spectrum $s_i(f)$ by the shear slowness S. As noted above, the monopole coherence $coh_{mono}(S,T)$ computed via Equation 4 or Equation 5 depends upon the measurement time, T. Various techniques can be used to remove this dependency on time. For example, "Semblance Processing of Borehole Acoustic Array Data" by Kimball and Marzetta referenced above describes a peak-finding routine to determine monopole coherence peaks over time and sets $coh_{mono}$ (S) to be the peak coherence over time for each possible slowness value S. Alternatively, U.S. Pat. No. 4,543,648 referenced above describes a technique in which monopole measurements from different shots of the monopole source over time are combined to remove the time dependency and thereby yield a monopole coherence $coh_{mono}$ (S) independent of time.

To allow combining of monopole coherence values $coh_{mono}$ (S) with multipole coherence values $coh_{quad}$ (S,$S_M$), the monopole coherence determination unit 615 also operates to project (e.g., extend) the determined coherence values $coh_{mono}$ (S) over the additional variable formation parameters for which the multipole coherence determination unit 620 computes multipole coherence values $coh_{quad}$ (S,$S_M$). For example, the monopole coherence determination unit 615 projects $coh_{mono}$ (S) for a particular possible value of shear slowness S over all mud slowness values $S_M$ of interest. In an example implementation, such projection is achieved by duplicating each monopole coherence value $coh_{mono}$ (S) for a particular possible value of shear slowness S over the mud slowness values $S_M$ of interest to yield monopole coherence value $coh_{mono}(S,S_M)$ that is a function of both shear slowness S and mud slowness $S_M$.

The logging unit 600 illustrated in FIG. 6 further includes a variance determination unit 640 to determine the variances, as well as the standard deviations, of the computed monopole coherence $coh_{mono}$ and multipole coherence $coh_{quad}$ to allow these coherences to be combined to form mixed coherence $coh_{mixed}$ according to Equation 1. In particular, the variance determination unit 640 processes the coherence values determined by the monopole coherence determination unit 615 and the multipole coherence determination unit 620, along with the collected monopole and multipole receiver waveforms, to compute the monopole and multipole coherence variance, $\sigma_{mono}^2$ and $\sigma_{quad}^2$, corresponding to each computed monopole coherence and multipole coherence $coh_{mono}$ and $coh_{quad}$. Example techniques for computing multipole coherence that may be implemented by the multipole coherence determination unit 620 include, but are not limited to, any, some or all of the techniques described in: (1) Kimball and Scheibner, "Error Bars for Sonic Slowness Measurements," Geophysics, Vol. 63, No. 2, 345-353 (March-April 1998); and (2) U.S. Pat. No. 5,661,696, issued on Aug. 26, 1997, to Kimball et al., all of which are hereby incorporated by reference in their respective entireties.

In an example implementation, the variance determination unit 640 computes the monopole and multipole coherence variance, $\sigma_{mono}^2$ and $\sigma_{quad}^2$, corresponding to each computed monopole coherence and multipole coherence $coh_{mono}$ and $coh_{quad}$ using the Cramer-Rao lower bound given by Equation 6 below.

$$\sigma^2 \geq [K_{array}K_{signal}(S/N)]^{-1} \qquad \text{Equation 6}$$

In Equation 6, $\sigma^2$ corresponds to either $\sigma_{mono}^2$ or $\sigma_{quad}^2$. Additionally, the parameter $K_{array}$ in Equation 6 is a constant representing a geometry of the set of receivers 405A-D included in the receiver array 400 used to obtain the monopole/multipole logging data. In an example implementation, $K_{array}$ is computed using Equation 7 below.

$$K_{array} = \sum_{i=1}^{N_r} (R_i - \tilde{R})^2 \qquad \text{Equation 7}$$

In Equation 7, $R_i$ represents the location of the $i^{th}$ receiver 405A-D, and $\tilde{R}$ represents the average receiver distance.

In Equation 6, the parameter $K_{signal}$ is a parameter representing the signal spectrum and dispersion characteristics of the backpropagated waveforms used to calculate coherence. In an example implementation, $K_{signal}$ is computed using Equation 8 below.

$$K_{signal} = \frac{(2\pi)^2 \int f^2 |s(f)|^2 \left(\frac{\partial \alpha(f)}{\partial S}\right)^2 df}{\int |s(f)|^2 df} \qquad \text{Equation 8}$$

In Equation 8, s(f) represents the frequency spectrum of the backpropagated and combined (e.g., summed or "stacked") receiver waveforms, and $\partial \alpha(f)/\partial S$ represents the partial derivative with respect to shear slowness S of the dispersion model $\alpha$ used to perform backpropagation or, in other words, the sensitivity of the dispersion model $\alpha$ with respect to shear slowness S. In the case of computing monopole variance $\sigma_{mono}^2$ of the computed monopole coherence $coh_{mono}$, the dispersion model $\alpha$ is equal to S and, thus, the partial derivative $\partial \alpha(f)/\partial S$ equals 1. In the case of computing multipole variance $\sigma_{quad}^2$ of the computed multipole coherence $coh_{quad}$, the partial derivative is taken of the dispersion model $\alpha = \alpha(f,S,S_M,S_C,\rho_b,\rho_m,HD)$.

Returning to Equation 6, the parameter S/N is a parameter representing the signal-to-noise ratio of the backpropagated set of receiver waveforms. In an example implementation, S/N is computed using Equation 9 below.

$$S/N = \frac{2 \times B \times T \times (N_r \cdot coh - 1)}{N_r \times (1 - coh)} \qquad \text{Equation 9}$$

In Equation 9, $N_r$ represents the number of receivers 405A-D included in the receiver array 400, B and T correspond to the measurement bandwidth and time interval, respectively, and coh represents either monopole coherence $coh_{mono}$ or multipole coherence $coh_{quad}$ depending upon whether monopole coherence variance $\sigma_{mono}^2$ or multipole coherence variance $\sigma_{quad}^2$ is being computed. Equation 6 through Equation 9 correspond to Equations (42) through (48) in "Error Bars for Sonic Slowness Measurements" by Kimball and Scheibner, and Equations (43) through (48) in U.S. Pat. No. 5,278,805 referenced above Coherence variance computed according to Equation 6 has equality when the equation is evaluated at the true shear slowness of the formation. However, during actual operation, the true shear slowness value is inherently unknown because the shear slowness is one or the formation parameters being estimated from the acoustic measurement logs. Accordingly, in at least some example implementations, the variance determination unit 640 uses an initial guess of the shear slowness, $S_{initial\_guess}$, to estimate coherence variance using Equation 10 below.

$$\sigma^2 \approx [K_{array}K_{signal}(S/N)]^{-1}|S=S_{initial\_guess} \qquad \text{Equation 10}$$

In an example implementation, the initial guess of the shear slowness, $S_{initial\_guess}$, is set to the shear slowness value yielding a maximum multipole coherence $coh_{quad}$ determined by the multipole coherence determination unit 620 (because multipole coherence can be computed for both fast and slow formations). In another example implementation, the initial guess of the shear slowness, $S_{initial\_guess}$, is set to the shear slowness value corresponding to the individual coherence value (i.e., individual monopole or multipole coherence value) for which the variance is being determined. However, as noted above, such shear slowness values may not be an accurate representation of the true shear slowness, which is one of the problems solved by the coherence combining techniques described herein.

If the variance determination unit 640 incorrectly uses an initial guess of the shear slowness, $S_{initial\_guess}$, that actually corresponds to another formation slowness parameter (e.g., such as compressional slowness or slowness corresponding to Stoneley waves observed in monopole logging, etc.), the variance determined using Equation 10 will likely be incorrect. To eliminate such erroneous initial guesses of shear slowness, the logging unit 600 includes a weight determination unit 645 to determine weighting factors (also referred to as weights or weight factors) to cause coherence values corresponding to possible shear slowness values that are not physically realizable in the formation to be excluded from subsequent processing. For example, a set of monopole weighting factors can be defined for use by the weight determination unit 645 to restrict the range of possible shear slowness values considered for monopole coherence and associated variance computation to be within a physically realizable range upper bounded by mud slowness and lower bounded by a multiple of compressional slowness. Mathematically, such monopole weighting factors can be determined by a monopole weighting curve $p_{mono}$ defined by the constraints provided in Equation 11 and Equation 12, which are:

$$p_{mono}(S>S_M)=0, \quad \text{Equation 11}$$

and $$p_{mono}(S<S_C \times V_p/V_{s_{min}})=0, \quad \text{Equation 12}$$

where $S$ represents shear slowness, $S_M$ represents mud slowness, $S_C$ represents compressional slowness, $V_p$ represents compressional wave velocity, and $V_{s_{min}}$ is a specified minimum possible shear slowness velocity.

Similarly, a set of multipole weighting factors can be defined for use by the weight determination unit 645 to restrict the range of possible shear slowness values considered for multipole coherence and associated variance computation to be within a physically realizable range upper bounded by a specified maximum possible shear slowness and lower bounded by a multiple of compressional slowness. Mathematically, such multipole weighting factors can be determined by a multipole weighting curve $p_{quad}$ defined by the constraints provided in Equation 13 and Equation 14, which are:

$$p_{quad}(S>S_{max})=0, \quad \text{Equation 13}$$

and $$p_{quad}(S<S_C \times V_p/V_{s_{min}})=0, \quad \text{Equation 14}$$

where $S$ represents shear slowness, $S_C$ represents compressional slowness, $V_p$ represents compressional wave velocity, $V_{s_{min}}$ is a specified minimum possible shear wave velocity and $S_{max}$ is a specified maximum possible shear slowness value. The specified minimum possible shear wave velocity $V_{s_{min}}$ and maximum possible shear slowness value $S_{max}$ may be input to the weight determination unit 645 via the control interface unit 630.

Figure 7A:
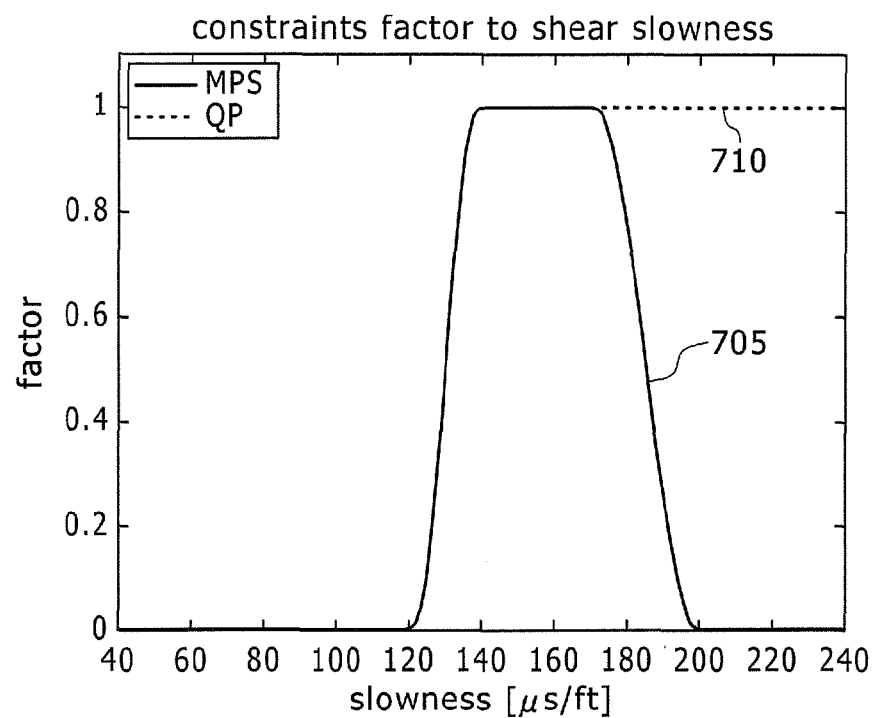
FIGS. 7A-B illustrate example weighting curves that may be evaluated by the logging unit of FIG. 6 to weight monopole and multipole acoustic logging measurements to be combined to determine shear slowness.
Figure 7B:
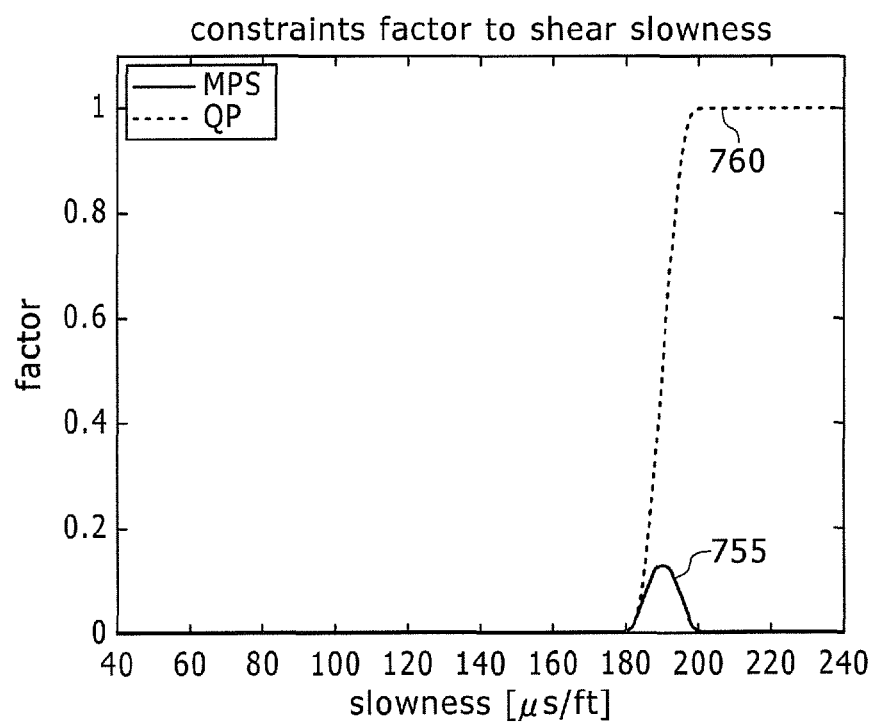

Example weighting curves $p_{mono}$ and $p_{quad}$ conforming to Equation 11 through Equation 14 that may be implemented by the weight determination unit 645 are illustrated in FIGS. 7A-B. FIG. 7A corresponds to a fast formation in which the mud slowness $S_M$ is 100 µs/ft, whereas FIG. 7B corresponds to a slow formation in which mud slowness $S_M$ is 200 µs/ft. In both FIG. 7A and FIG. 7B, the minimum possible shear wave velocity $V_{s_{min}}$ was specified such that $V_p/V_{s_{min}}=1.5$, and no maximum value of possible shear slowness $S_{max}$ was specified.

In the illustrated examples of FIGS. 7A-B, the weighting curves $p_{mono}$ and $p_{quad}$ are implemented using cosine taper functions with a lower taper length of 20 µs/ft and an upper taper limit of 30 µs/ft. However, any other type of weighting curve, such as the Normal (or Gaussian) curve, may alternatively be used to implement the weighting curves $p_{mono}$ and $p_{quad}$. In FIG. 7A corresponding to the fast formation, the $p_{mono}$ weighting curve 705 and the $p_{quad}$ weighting curve 710 substantially correspond, because both monopole and quadrupole techniques yield meaningful shear slowness estimates in the ranges defined by Equation 11 through Equation 14. However, in FIG. 7B corresponding to the fast formation, the $p_{mono}$ weighting curve 755 is dominated by the $p_{quad}$ weighting curve 760 substantially because the monopole technique does not yield meaningful shear slowness estimates in slow formations.

Figure 8:
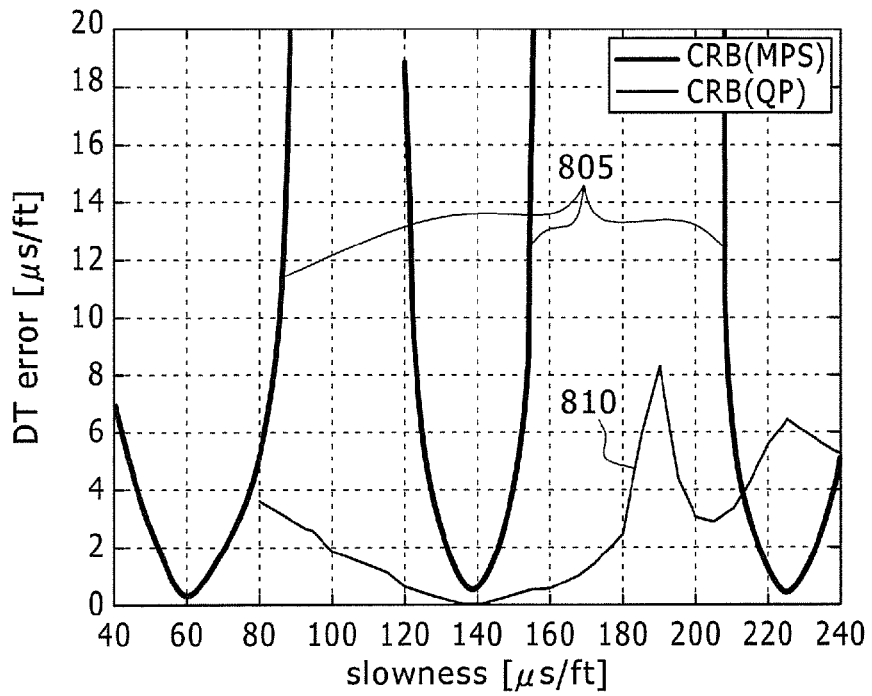
FIGS. 8-9 illustrate example variance estimates that may be determined by the logging unit of FIG. 6 to weight monopole and multipole acoustic logging measurements to be combined to determine shear slowness.
Figure 9:
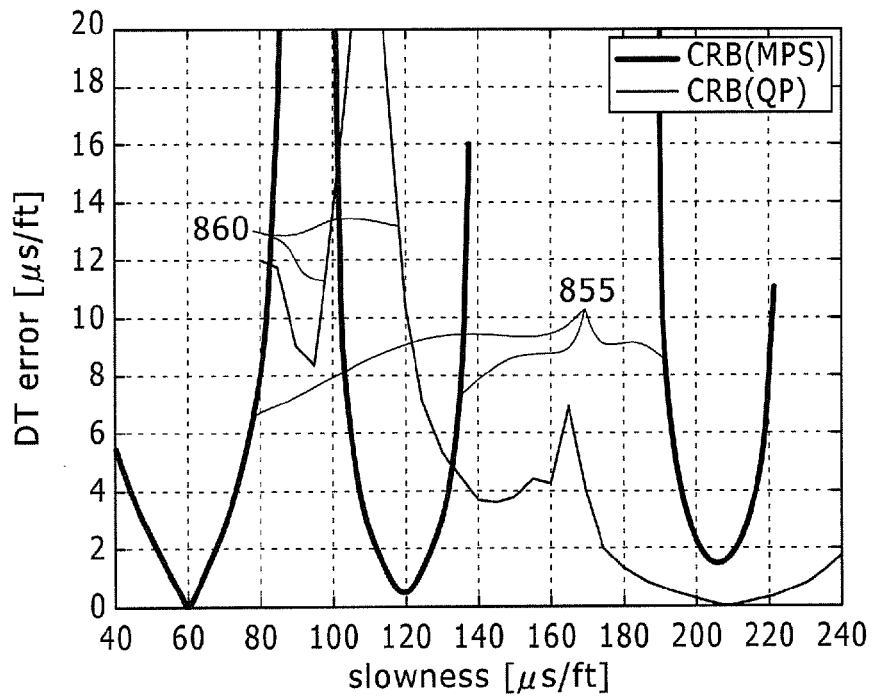

To illustrate operation of the weight determination unit 645 in conjunction with the variance determination unit 640, example curves illustrating coherence variance estimates computed by the variance determination unit 640 are illustrated in FIGS. 8-9. FIG. 8 corresponds to a fast formation having the formation parameters listed in Table 1 and depicts two variance curves, a monopole coherence variance ($\sigma_{mono}^2$) curve 805 and a multipole coherence variance ($\sigma_{quad}^2$) curve 810. As shown in FIG. 8, the $\sigma_{quad}^2$ curve 810 has a local minimum at a possible shear quad slowness value substantially corresponding with the actual shear slowness value of 140 µs/ft, which would be passed by the $p_{quad}$ weighting curve 710 of FIG. 7A. The $\sigma_{mono}^2$ curve 805 also has a local minimum at a possible shear slowness value substantially corresponding with the actual shear slowness value of 140 µs/ft, but also possesses local minima at possible shear slowness values of 60 and 225 µs/ft. However, the $p_{mono}$ weighting curve 705 of FIG. 7A would block the erroneous shear slowness values of 60 and 225 µs/ft and allow the proper shear slowness value of 140 µs/ft to pass.

TABLE 1

FORMATION PARAMETERS FOR VARIANCE ESTIMATION IN FAST FORMATION

| Formation Parameter | Value |
| --- | --- |
| Shear slowness, S | 140 µs/ft |
| Mud Slowness, $S_M$ | 200 µs/ft |
| Compressional Slowness, $S_C$ | 80 µs/ft |
| Formation Density, $\rho_b$ | 2.2 |
| Mud Density, $\rho_m$ | 1.5 |
| Borehole Diameter, HD | 6.5 |

FIG. 9 corresponds to a slow formation having the formation parameters listed in Table 2 and depicts two variance curves, a monopole coherence variance ($\sigma_{mono}^2$) curve 855 and a multipole coherence variance ($\sigma_{quad}^2$) curve 860. As shown in FIG. 9, the $\sigma_{quad}^2$ curve 860 has a local minimum at a possible shear slowness value substantially corresponding with the actual shear slowness value of 210 μs/ft, which would be passed by the $p_{quad}$ weighting curve 760 of FIG. 7B. The $\sigma_{mono}^2$ curve 855 also has a local minimum at a possible shear slowness value substantially corresponding with the actual shear slowness value of 210 μs/ft, but also possesses local minima at possible shear slowness values of 60 and 120 μs/ft. However, the $p_{mono}$ weighting curve 755 of FIG. 7B would block the erroneous shear slowness values of 60 and 120 μs/ft and allow the proper shear slowness value of 210 μs/ft to pass.

TABLE 2

FORMATION PARAMETERS FOR VAIANCE ESTIMATION IN SLOW FORMATION

| Formation Parameter | Value |
| --- | --- |
| Shear slowness, S | 210 μs/ft |
| Mud Slowness, $S_M$ | 200 μs/ft |
| Compressional Slowness, $S_C$ | 120 μs/ft |
| Formation Density, $\rho_b$ | 2.1 |
| Mud Density, $\rho_m$ | 1.5 |
| Borehole Diameter, HD | 6.5 |

Returning to FIG. 6, the Jogging unit 600 includes a coherence combiner 650 to determine mixed coherence values $coh_{mixed}$ by combining monopole coherence values $coh_{mono}$ determined by the monopole coherence determination unit 615 and multipole coherence values $coh_{quad}$ determined by the multipole coherence determination unit 620 for common possible shear slowness values S using monopole coherence and multipole coherence standard deviations $\sigma_{mono}$ and $\sigma_{quad}$ determined by the variance determination unit 640 for the same respective possible shear slowness values S. In a first example implementation, the coherence combiner 650 is configured to implement Equation 1 to determine the mixed coherence values $coh_{mixed}$ for different possible shear slowness values S.

In a second example implementation, the coherence combiner 650 is configured to also use the monopole weighting factors $p_{mono}$ and multipole weighting factors $p_{quad}$ determined by the weight determination unit 645 to combine monopole coherence values $coh_{mono}$ and multipole coherence values $coh_{quad}$ to determine mixed coherence $coh_{mixed}$. For example, in such an implementation, the coherence combiner 650 can be configured to determine mixed coherence $coh_{mixed}$ according to Equation 15 below.

$$coh_{mixed} = w_{mono} \, coh_{mono} + w_{quad} \, coh_{quad}$$

$$= \frac{p_{mono}/\sigma_{mono}}{1/\sigma_{mono} + 1/\sigma_{quad}} coh_{mono} + \frac{p_{quad}/\sigma_{quad}}{1/\sigma_{mono} + 1/\sigma_{quad}} coh_{quad}$$

Equation 15

In other words, the coherence combiner 650 determines the mixed coherence $coh_{mixed}$ by combining monopole coherence $coh_{mono}$ weighted by an overall weighting factor $w_{mono}$ accounting for both monopole coherence standard deviation $\sigma_{mono}$ and monopole weighting factor $p_{mono}$, with multipole coherence $coh_{quad}$ weighted by an overall weighting factor $w_{quad}$ accounting for both multipole coherence standard deviation $\sigma_{quad}$ and multipole weighting factor $p_{quad}$.

The logging unit 600 of FIG. 6 also includes a combined coherence maximizer 655 to identify the maximum combined, or mixed, coherence determined by the coherence combiner 650. For example, the combined coherence maximizer 655 is configured to keep track of and/or cycle through the mixed coherence values $coh_{mixed}$ determined by the coherence combiner 650 for a set of possible shear slowness values S. In an example implementation, the combined coherence maximizer 655 causes an initial mixed coherence value $coh_{mixed}$ to be determined for a possible shear slowness value identified by the multipole coherence determination unit 620 has having a maximum multipole coherence value $coh_{quad}$. The combined coherence maximizer 655 then causes the monopole coherence determination unit 615 and multipole coherence determination unit 620 to determine respective monopole coherence values $coh_{mono}$ and multipole coherence value $coh_{quad}$ which are combined by the coherence combiner 650 according to Equation 1 or Equation 15. The combined coherence maximizer 655 causes such iteration to continue until a maximum mixed coherence value $coh_{mixed}$ is identified. The combined coherence maximizer 655 then outputs the possible shear slowness value corresponding to the identified maximum mixed coherence value as the estimated shear slowness for the formation being measured. This resulting estimated shear slowness, and in some implementations the corresponding maximum mixed coherence value as well, are output by the combined coherence maximizer 655 via any appropriate output communication interface 660 for storage or display by any appropriate device (not shown).

While an example manner of implementing the logging unit 600 of has been illustrated in FIG. 6, one or more of the elements, processes and/or devices illustrated in FIG. 6 may be combined, divided, re-arranged, omitted, eliminated and/or implemented in any other way. Further, the example logging measurement collector 605, the example monopole coherence determination unit 615, the example multipole coherence determination unit 620, the example dispersion modeling unit 625, the example control interface unit 630, the example variance determination unit 640, the example weight determination unit 645, the example coherence combiner 650, the example combined coherence maximizer 655 and/or, more generally, the example logging unit 600 of FIG. 6 may be implemented by hardware, software, firmware and/or any combination of hardware, software and/or firmware. Thus, for example, any of the example logging measurement collector 605, the example monopole coherence determination unit 615, the example multipole coherence determination unit 620, the example dispersion modeling unit 625, the example control interface unit 630, the example variance determination unit 640, the example weight determination unit 645, the example coherence combiner 650, the example combined coherence maximizer 655 and/or, more generally, the example logging unit 600 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example logging unit 600, the example logging measurement collector 605, the example monopole coherence determination unit 615, the example multipole coherence determination unit 620, the example dispersion modeling unit 625, the example control interface unit 630, the example variance determination unit 640, the example weight determination unit 645, the example coherence combiner 650 and/or the example combined coherence maximizer 655 are hereby expressly defined to include a tangible medium such as a memory, digital versatile disk (DVD), compact disk (CD), etc., storing such software and/or firmware. Further still, the example logging unit 600 of FIG. 6 may include one or more elements, processes and/or devices in addition to, or instead of, those illustrated in FIG. 6, and/or may include more than one of any or all of the illustrated elements, processes and devices.

Figure 10:
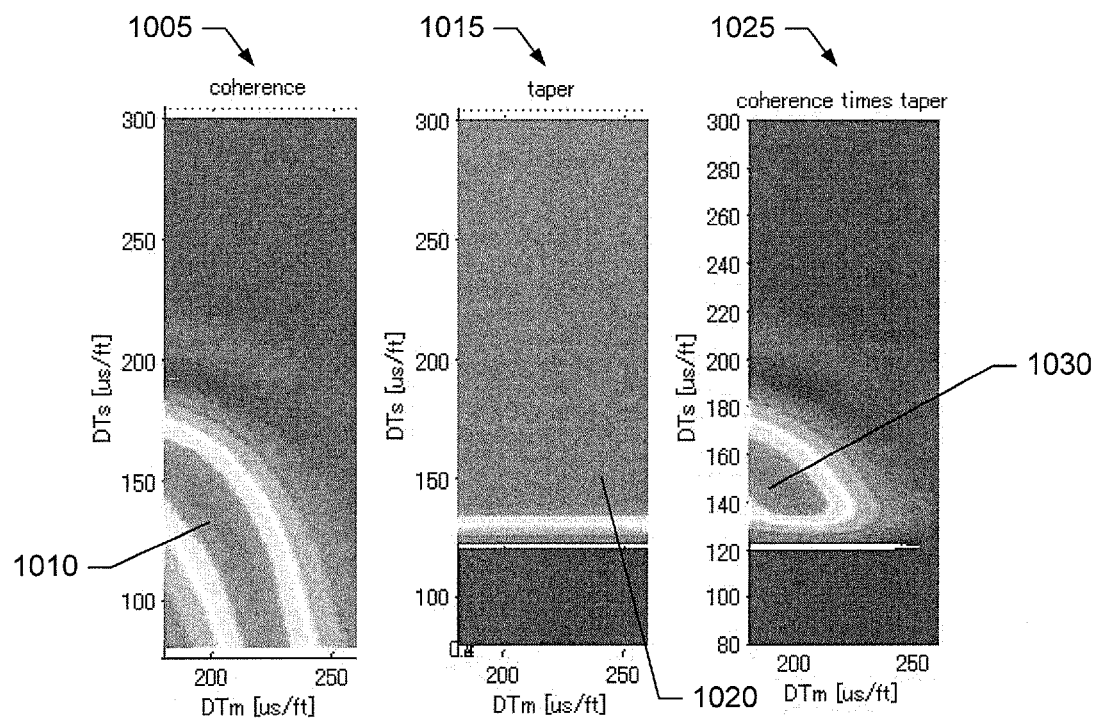
FIG. 10 illustrates an example operation of the logging unit of FIG. 6 to determine weighted monopole coherence values from monopole logging measurements.
Figure 11:
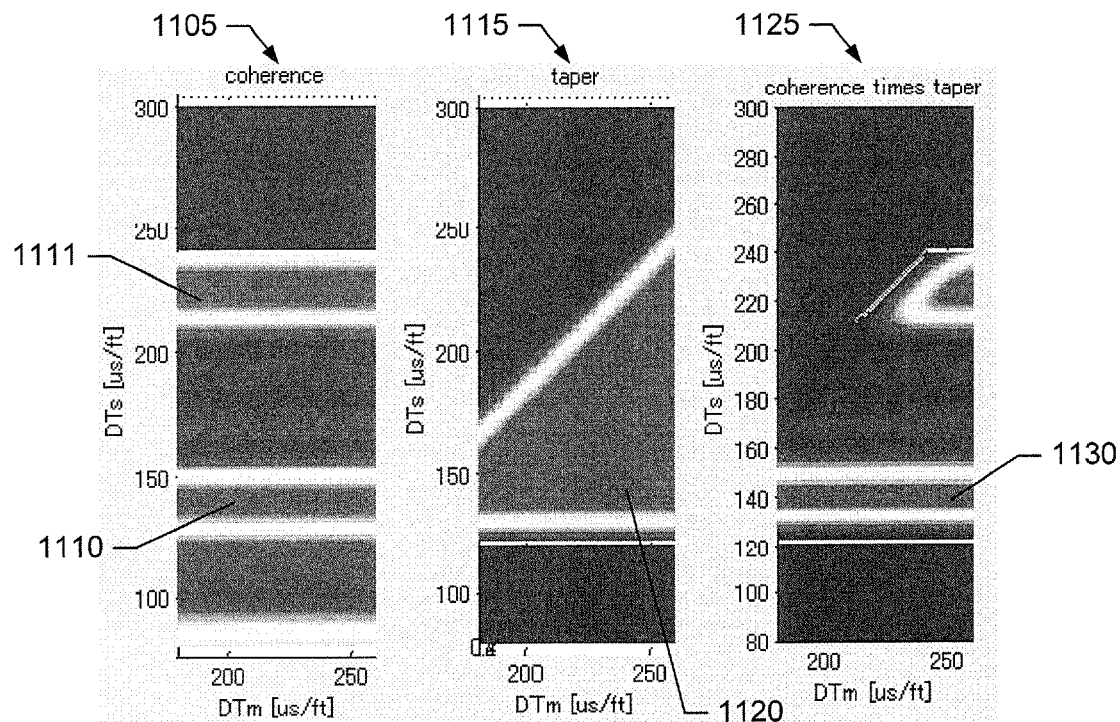
FIG. 11 illustrates an example operation of the logging unit of FIG. 6 to determine weighted multipole coherence values from monopole logging measurements.
Figure 12:
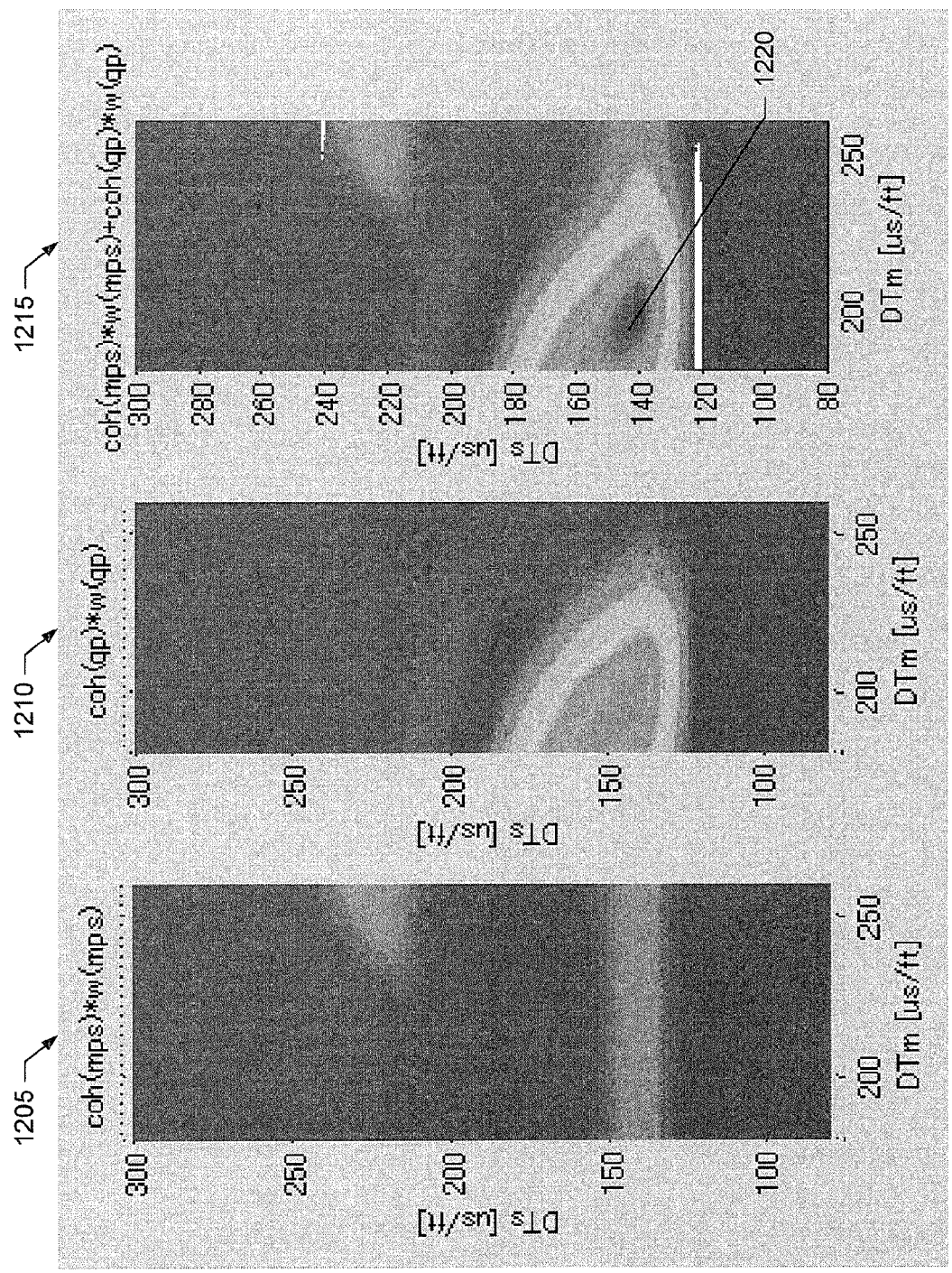
FIG. 12 illustrates an example operation of the logging unit of FIG. 6 to combine the weighted monopole coherence values of FIG. 10 and the weighted multipole coherence values of FIG. 11 to determined mixed coherence values from which shear slowness may be determined.

FIGS. 10-12 further illustrate operation of the example logging unit 600 of FIG. 6. In particular, an example operation of the logging unit 600 to determine and weight multipole coherence for use in forming mixed coherence is illustrated in FIG. 10. Similarly, an example operation of the logging unit 600 to determine and weight monopole coherence for use in forming mixed coherence is illustrated in FIG. 11. Then, an example operation of the logging unit to combine the weighted multipole coherence of FIG. 10 and the weighted monopole coherence of FIG. 11 to form mixed coherence is illustrated in FIG. 11. The examples of FIG. 10-12 correspond to a fast formation with the formation parameters listed in Table 1 and additional system parameters and results listed in Table 3. Table 3 also lists additional system parameters and results used to generate the example curves of FIGS. 7A-B, 8 and 9.

TABLE 3

EXAMPLE SYSTEM PARAMETERS AND RESULTS

| Parameter | Monopole | Multipole |
|---|---|---|
| Frequency Band, B | 8-12 kHz | 8-12 kHz |
| Integration Time Window, T | 250 μs | 4500 μs |
| Number of Receiver, $N_r$ | 12 | 12 |
| Computed Coherence at Ideal Shear Slowness, S | Fast Formation: 0.9798<br>Slow Formation: 0.9090 | Fast Formation: 0.9996<br>Slow Formation: 0.9999 |
| $K_{array}$ | 15.9 ft$^2$ | 15.9 ft$^2$ |
| $K_{signal}$ | Fast Formation: 0.00025<br>Slow Formation: 0.00023 | Fast Formation: 0.00029<br>Slow Formation: 0.00024 |
| S/N | Fast Formation: 0.044<br>Slow Formation: 0.009 | Fast Formation: 180000<br>Slow Formation: 1020000 |
| Variance, $\sigma^2$ | Fast Formation: 0.75<br>Slow Formation: 1.74 | Fast Formation: 0.109<br>Slow Formation: 0.67 |
| Weighting Factor, p | Fast Formation: 1.0<br>Slow Formation: 0.0 | Fast Formation: 1.0<br>Slow Formation: 1.0 |
| Overall Weighting Factor, w | Fast Formation: 0.127<br>Slow Formation: 0.0 | Fast Formation: 0.873<br>Slow Formation: 1.0 |

Turning to FIG. 10, an example graph 1005 illustrates example multipole coherence values $coh_{quad}(S,S_M)$ determined by the multipole coherence determination unit 620 for a set of possible combinations of shear slowness S and mud slowness $S_M$. The example graph 1005 depicts a region 1010 containing locally maximum values of $coh_{quad}(S,S_M)$. An example graph 1015 included in FIG. 10 illustrates a two-dimensional plot of the multipole weighting function $p_{quad}$ determined by the weight determination unit 645. As shown in the example graph 1015, the multipole weighting function $p_{quad}$ passes multipole coherence values $coh_{quad}(S,S_M)$ in a region 1020. FIG. 10 further illustrates an example graph 1025 depicting the results of the coherence combiner 650 weighting the multipole coherence values $coh_{quad}(S,S_M)$ illustrated in the graph 1005 by the multipole weighting function $p_{quad}$ illustrated in the graph 1015. As shown in the example graph 1025, weighting the multipole coherence values $coh_{quad}(S,S_M)$ by the multipole weighting function $p_{quad}$ yields a region 1030 of locally maximum weighted multipole coherence values that includes the actual shear slowness S and mud slowness $S_M$ values of 140 μs/ft and 200 μs/ft, respectively.

Turning to FIG. 11, an example graph 1105 illustrates example monopole coherence values $coh_{mono}(S,S_M)$ determined by the monopole coherence determination unit 615 for a set of shear slowness values S and projected (e.g., duplicated) over a set of possible mud slowness values $S_M$. The example graph 1105 depicts example region 1110 and 1111 containing locally maximum values of $coh_{mono}(S,S_M)$. An example graph 1115 included in FIG. 11 illustrates a two-dimensional plot of the monopole weighting function $p_{mono}$ determined by the weight determination unit 645. As shown in the example graph 1115, the monopole weighting function $p_{mono}$ includes a tapered region 1120 in which monopole coherence values $coh_{mono}(S,S_M)$ are passed. FIG. 11 further illustrates an example graph 1125 depicting the results of the coherence combiner 650 weighting the monopole coherence values $coh_{mono}(S,S_M)$ illustrated in the graph 1105 by the monopole weighting function $p_{mono}$ illustrated in the graph 1115. As shown in the example graph 1125, weighting the monopole coherence values $coh_{mono}(S,S_M)$ by the monopole weighting function $p_{mono}$ yields a region 1130 of locally maximum weighted monopole coherence values that includes the actual shear slowness S and mud slowness $S_M$ values of 140 μs/ft and 200 μs/ft, respectively. Additionally, such weighting excludes a substantial portion of the region 1111 corresponding to an erroneous shear slowness estimate.

FIG. 12 depicts example graphs 1205, 1210 and 1215 depicting processing performed by the coherence combiner 650 to determine mixed coherence $coh_{mixed}(S,S_M)$. The example graph 1205 illustrates the example weighted monopole coherence depicted in the example graph 1125 of FIG. 11 further weighted to account for the standard deviation (or variance) associated with the computed monopole coherence values $coh_{mono}(S,S_M)$. In other words, the example graph 1205 corresponds to the first term in Equation 15. Similarly, the example graph 1210 of FIG. 12 illustrates the example weighted multipole coherence depicted in the example graph 1025 of FIG. 10 further weighted to account for the standard deviation (or variance) associated with the computed multipole coherence values $coh_{quad}(S,S_M)$. In other words, the example graph 1205 corresponds to the second term in Equation 15. The example graph 1215 depicts the results of combining (e.g., adding) the weighted monopole coherence values of graph 1205 and the weighted multipole coherence values of graph 1210 to form mixed coherence. As depicted in graph 1215, such combining of weighted monopole and multipole coherence values according to the techniques described herein yields a sharply defined region 1220 of local maxima including the actual shear slowness S and mud slowness $S_M$ values of 140 μs/ft and 200 μs/ft, respectively.

Table 3 illustrates other properties of the mixed coherence processing performed by the example logging unit 600 of FIG. 6. For example, in the modeled fast formation, the overall monopole weighting factor $w_{mono}$ is significantly smaller than the overall multipole weighting factor $w_{quad}$. This difference is primarily due to the significantly larger multipole signal-to-noise ratio S/N relative to monopole S/N. The reason for the significant difference in S/N is that the shear head wave included in the monopole receiver waveforms can be contaminated by preceding arrivals, such as compressional head wave arrivals, resulting in a computed monopole coherence lower than the computed multipole coherence. Additionally, the integration time window for determining monopole coherence is significantly shorter than the time window for determining multipole coherence to prevent contamination by other arriving waves, something than is not a concern in quadrupole mode processing.

Table 3 also illustrates that, in the modeled slow formation, the overall monopole weighting factor $w_{mono}$ becomes zero, whereas the overall multipole weighting factor $w_{quad}$ becomes one. Thus, the monopole coherence does not contribute to mixed coherence in a slow formation. This is expected because, as discussed above, monopole acoustic logging can be used to determine shear slowness in fast formations, but not slow formations.

Figure 13A:
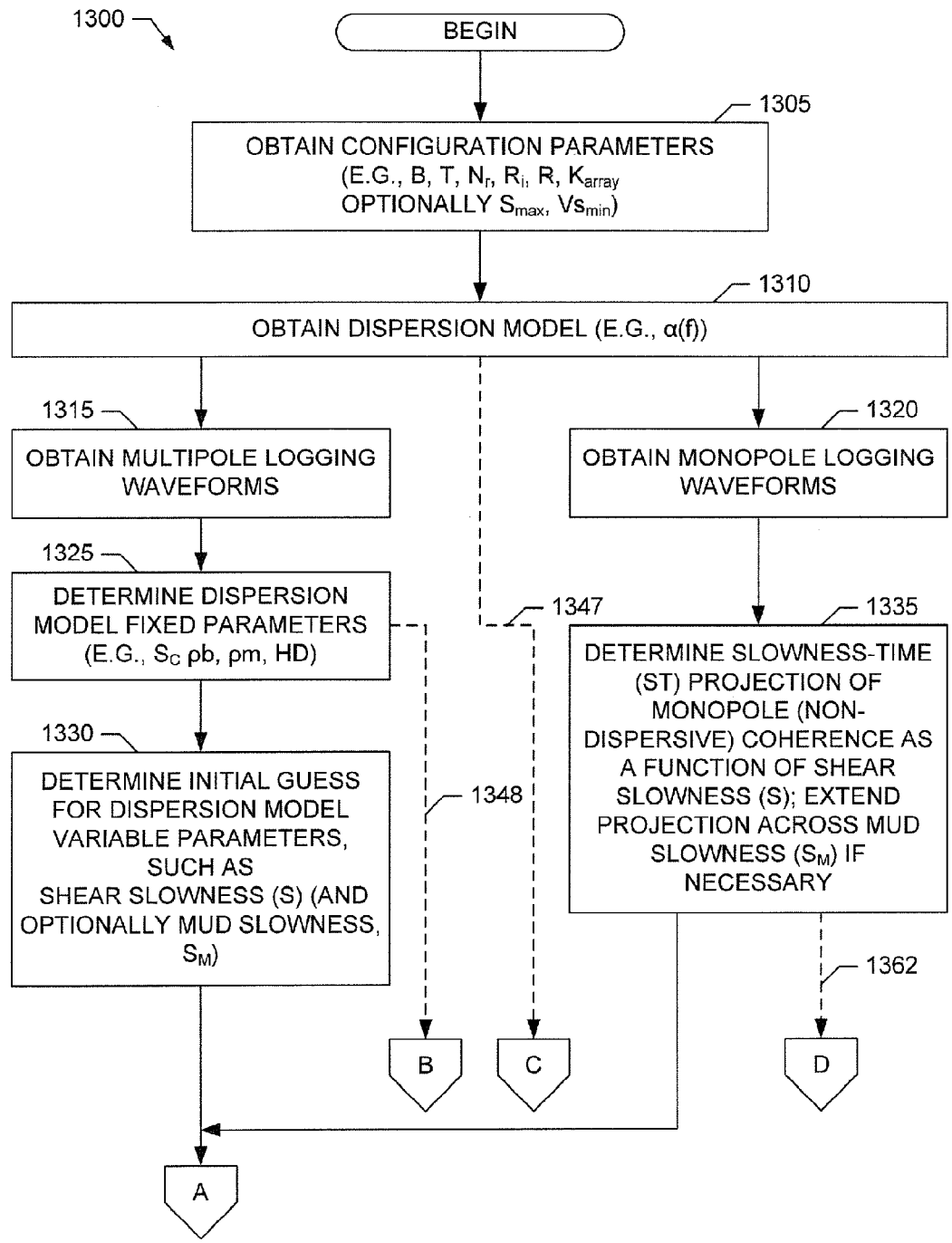
FIGS. 13A-B collectively illustrate a flowchart representative of an example process that may be performed to implement the logging unit of FIG. 6.
Figure 13B:
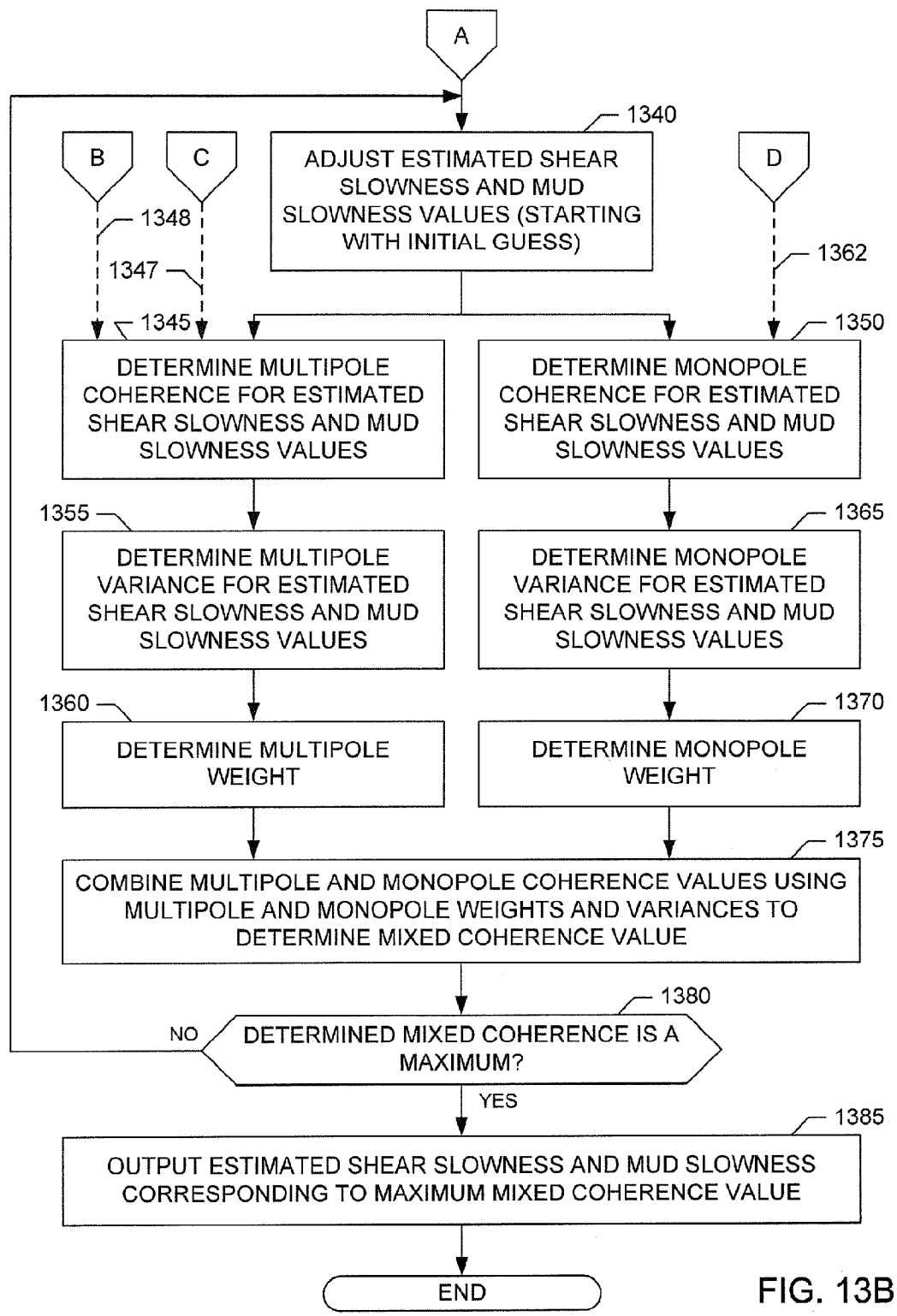

A flowchart representative of an example process that may be executed to implement the example logging unit 600, the example logging measurement collector 605, the example monopole coherence determination unit 615, the example multipole coherence unit 620, the example dispersion modeling unit 625, the example control interface unit 630, the example variance determination unit 640, the example weight determination unit 645, the example coherence combiner 650 and/or the example combined coherence maximizer 655 is shown in FIGS. 13A-B. In this example, the process represented by the flowchart may be implemented by one or more programs comprising machine readable instructions for execution by: (a) a processor, such as the processor 1412 shown in the example computer 1400 discussed below in connection with FIG. 14, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1412, but the entire program or programs and/or portions thereof could alternatively be executed by a device other than the processor 1412 and/or embodied in firmware or dedicated hardware (e.g., implemented by an application specific integrated circuit (ASIC), a programmable logic device (PLD), a field programmable logic device (FPLD), discrete logic, etc.).

For example, any or all of the example logging unit 600, the example logging measurement collector 605, the example monopole coherence determination unit 615, the example multipole coherence unit 620, the example dispersion modeling unit 625, the example control interface unit 630, the example variance determination unit 640, the example weight determination unit 645, the example coherence combiner 650 and/or the example combined coherence maximizer 655 could be implemented by any combination of software, hardware, and/or firmware. Also, some or all of the process represented by the flowchart of FIGS. 13A-B may be implemented manually. Further, although the example process is described with reference to the flowchart illustrated in FIGS. 13A-B, many other techniques for implementing the example methods and apparatus described herein may alternatively be used. For example, with reference to the flowchart illustrated in FIGS. 13A-B, the order of execution of the blocks may be changed, and/or some of the blocks described may be changed, eliminated, combined and/or subdivided into multiple blocks.

An example process 1300 that may be executed to implement the example logging unit 600 of FIG. 6 is illustrated in FIGS. 13A-B. The example process 1300 may be executed at predetermined intervals (e.g., such as at specified measurement times), based on an occurrence of a predetermined event (e.g., such as when a particular measurement depth is reached), etc., or any combination thereof. With reference to FIG. 6, the process 1300 begins execution at block 1305 of FIG. 13A at which the logging unit 600 obtains configuration parameters to be used for acoustic logging. For example, at block 1305 the control interface unit 630 obtains one or more system parameters, such as the number $N_r$ of receivers 405A-D included in the receiver array 400, the measurement bandwidth B and interval T for monopole and multipole measurements, the receiver locations $R_i$, the average receiver distance $\tilde{R}$, the receiver array geometry parameter $K_{array}$, the specified minimum possible shear slowness velocity $V_{s_{min}}$, the specified maximum possible shear slowness value $S_{max}$, etc. Additionally or alternatively, at block 1305 the control interface unit 630 may be used to select one of multiple dispersion models α to be used for multipole coherence computation.

Next, control proceeds to block 1310 at which the dispersion modeling unit 625 included in the logging unit 600 obtains the dispersion model a (e.g., as specified at block 1305) for use in computing multipole coherence. Control then proceeds to block 1315 for initial multipole coherence processing and block 1320 for initial monopole coherence processing. The two control paths beginning with blocks 1315 and 1320 can be executed in parallel (e.g., in an example implementation supporting parallel processing), sequentially (e.g., in an example implementation not supporting parallel processing), or any combination thereof (e.g., with some portions of the two control paths executed in parallel and other portions executed sequentially).

Turning to block 1315, the logging measurement collector 605 included in the logging unit 600 obtains multipole waveform data from multipole logging measurements detected, for example, by the acoustic receiver array 400 included in the LWD 120/120A described above. Then, control proceeds to block 1325 at which the logging unit obtains one or more fixed formation parameters of a dispersion model used to determine multipole coherence. For example, at block 1325 the fixed formation parameters may be specified via the control interface unit 630, determined by any formation measurement technique, or any combination thereof. The fixed formation parameters obtained at block 1325 include, but are not limited to, compressional slowness $S_c$, formation density $\rho_b$, mud (fluid) density $\rho_m$ and borehole diameter HD.

Next, control proceeds to block 1330 at which the multipole coherence determination unit 620 included in the logging unit 600 determines an initial guess for the variable formation parameters of the dispersion model a obtained at block 1310. Such variable formation parameters include, but are not limited to, shear slowness S and optionally mud slowness $S_M$. For example, at block 1330 the multipole coherence determination unit 620 uses the dispersion model α obtained at block 1310 and the fixed formation parameters specified at block 1325 to determine the initial guess of shear slowness $S_{initial\_guess}$ and optionally mud slowness $S_{M_{initial\_guess}}$ to be the values of these variable parameters that maximizes multipole coherence, $coh_{quad}$ computed from Equation 2, as described above.

Returning to block 1320, the logging measurement collector 605 included in the logging unit 600 obtains monopole waveform data from monopole logging measurements detected, for example, by the acoustic receiver array 400 included in the LWD 120/120A described above. Then, control proceeds to block 1335 at which the monopole coherence determination unit 615 determines monopole coherence, $coh_{mono}$, for different possible shear slowness, S, using Equation 4 and/or Equation 5, as described above. Additionally, at block 1335 the monopole coherence determination unit 615 employs one or more of the peak-finding technique of Kimball and Marzetta or the shot-to-shot measurement technique of Hsu described above to remove the time dependency from the computed monopole coherence values to yield a projection of monopole coherence that is a function of only possible shear slowness, S. Furthermore, at block 1335 the monopole coherence determination unit 615 then projects (e.g., extends/ duplicates) the computed monopole coherence over a set of possible mud slowness values $S_M$ as described above to yield computed monopole coherence values $coh_{mono}(S,S_M)$ corresponding to possible combinations of shear slowness values S and mud slowness values $S_M$.

After processing at blocks 1330 and 1335 completes, control proceeds to block 1340 of FIG. 13B at which the logging unit 600 initializes the shear slowness and mud slowness values for mixed coherence computation to the initial guess values determined at block 1330 of FIG. 13A. Control then proceeds to block 1345 for multipole coherence computation and weighting, and block 1350 for monopole coherence computation and weighting. The two control paths beginning with blocks 1345 and 1350 can be executed in parallel (e.g., in an implementation supporting parallel processing), sequentially (e.g., in an implementation not supporting parallel processing), or any combination thereof (e.g., with some portions of the two control paths executed in parallel and other portions executed sequentially).

Turning to block 1345, the multipole coherence determination unit 620 included in the logging unit 600 uses the dispersion model a obtained at block 1310 (represented as an input dashed line 1347) and the fixed formation parameters specified at block 1325 (represented as an input dashed line 1348) to compute a multipole coherence value $coh_{quad}$ using Equation 2, as described above, for the shear slowness value S and mud slowness value $S_M$ set at block 1340. Control then proceeds to block 1355 at which the variance determination unit 640 included in the logging unit 600 determines the multipole coherence variance $\sigma_{quad}^2$ corresponding to the multipole coherence value $coh_{quad}$ determined at block 1345. For example, at block 1355 the variance determination unit 640 may determine the multipole coherence variance $\sigma_{quad}^2$ for the quad computed multipole coherence value $coh_{quad}$ using Equation 7 through Equation 10, as described above, with the initial guess of shear slowness, $S_{initial\_guess}$, set to the initial guess determined at block 1330 of FIG. 13A or, alternatively, the current value of shear slowness set at block 1340 of FIG. 13B.

Next, control proceeds to block 1360 at which the weight determination unit 645 determines the multipole weighting factor $p_{quad}$ corresponding to the shear slowness value S and mud slowness value $S_M$ set at block 1340 and for which multipole coherence $coh_{quad}$ and multipole coherence variance $\sigma_{quad}^2$ were computed at blocks 1345 and 1355, respectively. For example, at block 1360 the weight determination unit 645 evaluates a specified weighting curve, such as the cosine taper utilized in FIGS. 7A-B, or a Normal (e.g., Gaussian) curve, etc., satisfying the constraints of Equation 13 and Equation 14 at the shear slowness value S and mud slowness value $S_M$ set at block 1340.

Returning to FIG. 14, the monopole coherence determination unit 615 included in the logging unit 600 uses the set of monopole coherence values $coh_{mono}(S,S_M)$ determined at block 1335 for the possible combinations of shear slowness and mud slowness (represented as an input dashed line 1362) to determine a particular monopole coherence value $coh_{mono}(S,S_M)$ for the shear slowness value S and mud slowness value $S_M$ set at block 1340. Control then proceeds to block 1365 at which the variance determination unit 640 included in the logging unit 600 determines the monopole coherence variance $\sigma_{mono}^2$ corresponding to the monopole coherence value $coh_{mono}$ determined at block 1350. For example, at block 1365 the variance determination unit 640 may determine the monopole coherence variance $\sigma_{mono}^2$ for the computed monopole coherence value $coh_{mono}$ using Equation 7 through Equation 10, as described above, with the initial guess of shear slowness, $S_{initial\_guess}$, set to the initial guess determined at block 1330 of FIG. 13A or, alternatively, the current value of shear slowness set at block 1340 of FIG. 13B.

Next, control proceeds to block 1370 at which the weight determination unit 645 determines the monopole weighting factor $p_{mono}$ corresponding to the shear slowness value S and mud slowness value $S_M$ set at block 1340 and for which monopole coherence $coh_{mono}$ and monopole coherence variance $\sigma_{mono}^2$ were computed at blocks 1350 and 1365, respectively. For example, at block 1370 the weight determination unit 645 evaluates a specified weighting curve, such as the cosine taper utilized in FIGS. 7A-B, or a Normal (e.g., Gaussian) curve, etc., satisfying the constraints of Equation 11 and Equation 12 at the shear slowness value S and mud slowness value $S_M$ set at block 1340.

After processing at blocks 1360 and 1370 completes, control proceeds to block 1375 at which the coherence combiner 650 included in the logging unit 600 uses Equation 15 to determine the mixed coherence $coh_{mixed}$ for the shear slowness value S and mud slowness value $S_M$ set at block 1340 by combining the monopole coherence $coh_{mono}$ determined at block 1350 weighted by an overall weighting factor $w_{mono}$ with the multipole coherence $coh_{quad}$ determined at block 1345 weighted by an overall weighting factor $w_{quad}$. In an example implementation, the overall weighting factor $w_{mono}$ is determined using Equation 15 and accounts for both the monopole coherence standard deviation $\sigma_{mono}$ determined at block 1365 and the monopole weighting factor $p_{mono}$ determined at block 1370. Similarly, the overall weighting factor $w_{quad}$ is determined using Equation 15 and accounts for both the multipole coherence standard deviation $\sigma_{quad}$ determined at block 1355 and the multipole weighting factor $p_{quad}$ determined at block 1360. In an alternative implementation, the weighting factors $p_{mono}$ and $p_{quad}$ are not used and the coherence combiner 650 uses Equation 1 to determine the mixed coherence $coh_{mixed}$.

Next, control proceeds to block 1380 at which the combined coherence maximizer 655 included in the logging unit 600 determines whether the mixed coherence $coh_{mixed}$ determined at block 1375 is a maximum. If the mixed coherence $coh_{mixed}$ determined at block 1375 is not a maximum (block 1380), control returns to block 1340 and blocks subsequent thereto at which a new possible shear slowness value S and mud slowness value $S_M$ is configured for processing. However, if the mixed coherence $coh_{mixed}$ determined at block 1375 is a maximum (block 1380), control proceeds to block 1385 at which the combined coherence maximizer 655 outputs the shear slowness value S and mud slowness value $S_M$ corresponding to the maximum mixed coherence value $coh_{mixed}$ as the estimated shear slowness S and mud slowness $S_M$ for the formation being measured. Execution of the example process 1300 then ends.

Figure 14:
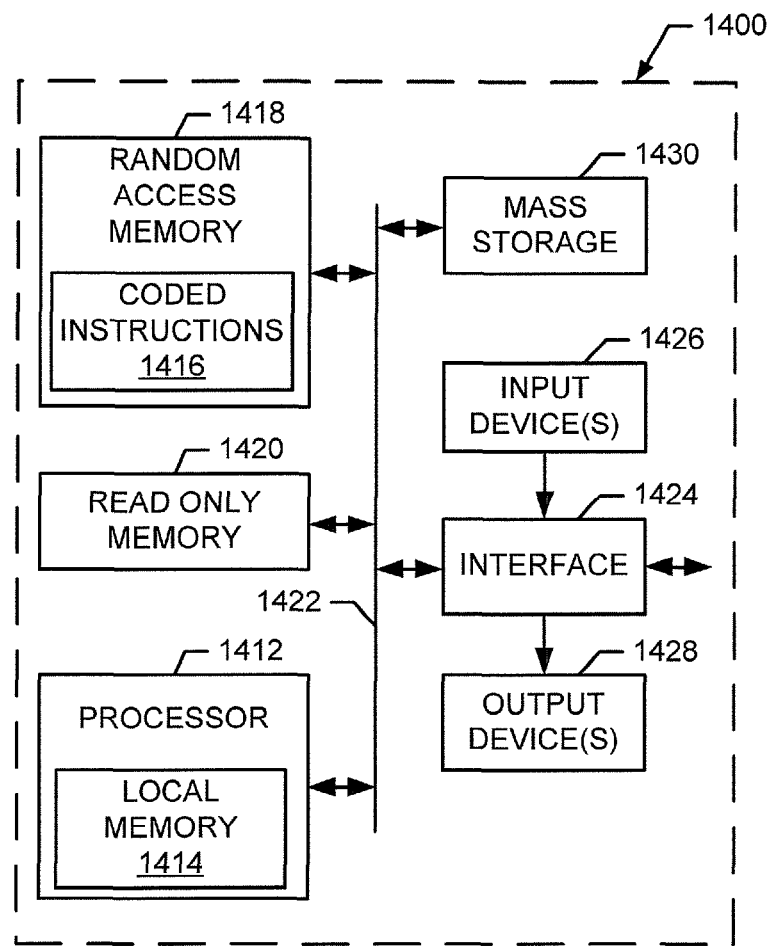
FIG. 14 is a block diagram of an example computer system that may execute example machine readable instructions to implement some or all of the process of FIGS. 13A-B to implement the logging unit of FIG. 6.

FIG. 14 is a block diagram of an example computer 1400 capable of implementing the apparatus and methods disclosed herein. The computer 1400 can be, for example, a server, a personal computer, a personal digital assistant (PDA), an Internet appliance, a DVD player, a CD player, a digital video recorder, a personal video recorder, a set top box, or any other type of computing device.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, machine readable instructions to implement the process represented in FIGS. 13A-B. The processor 1412 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown).

The computer 1400 also includes an interface circuit 1424. The interface circuit 1424 may be implemented by any type of interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1400 also includes one or more mass storage devices 1430 for storing software and data. Examples of such mass storage devices 1430 include floppy disk drives, hard drive disks, compact disk drives and digital versatile disk (DVD) drives.

As an alternative to implementing the methods and/or apparatus described herein in a system such as the device of FIG. 14, the methods and or apparatus described herein may be embedded in a structure such as a processor and/or an ASIC (application specific integrated circuit).

From the foregoing, methods and apparatus to combine monopole and multipole acoustic logging measurements to determine shear slowness have been disclosed. As mentioned above, determining shear slowness of a formation is often an important goal of LWD acoustic processing. Unlike many existing acoustic logging techniques, the example methods and apparatus described herein are able to determine reliable shear slowness measurements across both fast and slow formations.

The example acoustic logging methods and apparatus as described above obtain shear slowness measurements by statistically combining shear slowness measurements determined via monopole logging and corresponding shear slowness measurements determined via multipole (e.g., quadrupole) logging. For example, mixed coherence values are determined by combining monopole and multipole coherence values determined from the measured logging data and corresponding to the same possible shear slowness values (as well as the same combinations of other formation parameters). In such an example, respective monopole and multipole coherence values are combined after weighting according to their respective measurement error, which may be represented by respective measurement variances or, equivalently, standard deviations. Additional weighting may be used to exclude possible shear slowness values that are not physically realizable in the formation. The estimated shear slowness for the formation at the particular location corresponding to the monopole and multipole logging data is then determined to be the possible shear slowness value corresponding to the maximum mixed coherence.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine shear slowness of a formation from acoustic logging data, the method comprising:
    determining a plurality of mixed coherence values corresponding to a respective plurality of possible shear slowness values, each mixed coherence value determined by combining a monopole coherence value determined from monopole logging data and a multipole coherence value determined from multipole logging data, the monopole and multipole coherence values each being determined for a particular possible shear slowness value corresponding to the mixed coherence value;
    using the particular shear slowness value corresponding to a maximum mixed coherence value in the plurality of mixed coherence values to represent the shear slowness of the formation; and
    displaying or storing on a non-transient medium the particular shear slowness value corresponding to the maximum mixed coherence value.

2. A method as defined in claim 1 wherein combining the monopole coherence value and the multipole coherence value comprises:
    determining a standard deviation of the monopole coherence value;
    determining a standard deviation of the multipole coherence value;
    weighting the monopole coherence value by a first combination of the determined standard deviations of the monopole and multipole coherence values;
    weighting the multipole coherence value by a second combination of the determined standard deviations of the monopole and multipole coherence values; and
    summing the weighted monopole and multipole coherence values.

3. A method as defined in claim 2 wherein determining the standard deviation of the monopole coherence value comprises:
    determining a first parameter value representative of a geometry of a set of receivers used to obtain the monopole logging data;
    backpropagating a set of receiver waveforms obtained from the monopole logging data using the particular shear slowness value corresponding to the monopole coherence value, the set of receiver waveforms corresponding respectively to the set of receivers used to obtain the monopole logging data;

processing the backpropagated set of receiver waveforms to determine a frequency spectrum;

determining a second parameter value from the determined frequency spectrum;

determining a third parameter value representative of a signal-to-noise ratio of the backpropagated set of receiver waveforms; and combining the first, second and third parameters to determine the standard deviation of the monopole coherence value.

4. A method as defined in claim 2 wherein determining the standard deviation of the multipole coherence value comprises:

determining a first parameter value representative of a geometry of a set of receivers used to obtain the multipole logging data;

backpropagating a set of receiver waveforms obtained from the multipole logging data using a dispersion model evaluated at the particular shear slowness value corresponding to the multipole coherence value, the set of receiver waveforms corresponding respectively to the set of receivers used to obtain the multipole logging data;

processing the backpropagated set of receiver waveforms to determine a frequency spectrum;

determining a second parameter value from the determined frequency spectrum;

determining a third parameter value representative of a signal-to-noise ratio of the backpropagated set of receiver waveforms; and combining the first, second and third parameters to determine the standard deviation of the multipole coherence value.

5. A method as defined in claim 1 wherein combining the monopole coherence value and the multipole coherence value comprises:

weighting the monopole coherence value by a first weight factor determined by evaluating a first weighting function at the particular possible shear slowness value corresponding to the monopole coherence value, the first weighting function being substantially equal to zero for possible shear slowness values greater than a mud slowness value or less than a scaled compressional slowness value;

weighting the multipole coherence value by a second weight factor determined by evaluating a second weighting function at the particular possible shear slowness value corresponding to the multipole coherence value, the second weighting function being substantially equal to zero for possible shear slowness values less than the scaled compressional slowness value; and combining the weighted monopole and weighted multipole coherence values.

6. A method as defined in claim 1 further comprising determining the monopole coherence value by:

backpropagating a set of receiver waveforms obtained from the monopole logging data using the particular shear slowness value corresponding to the monopole coherence value, the set of receiver waveforms corresponding respectively to a set of receivers used to obtain the monopole logging data; and processing the backpropagated set of receiver waveforms to determine the monopole coherence value.

7. A method as defined in claim 1 further comprising determining the multipole coherence value by:

backpropagating a set of receiver waveforms obtained from the multipole logging data using a dispersion model evaluated at the particular shear slowness value corresponding to the multipole coherence value, the set of receiver waveforms corresponding respectively to a set of receivers used to obtain the multipole logging data; and processing the backpropagated set of receiver waveforms to determine the multipole coherence value.

8. A method as defined in claim 1 wherein the plurality of mixed coherence values correspond to a respective plurality of pairs of possible shear slowness and mud slowness values, and further comprising:

identifying a first pair of possible shear slowness and mud slowness values corresponding to the maximum mixed coherence value in the plurality of mixed coherence values; and using the possible shear slowness value from the first pair of possible shear slowness and mud slowness values to represent the shear slowness of the formation.

9. A tangible article of manufacture storing machine readable instructions which, when executed, cause a machine to:

combine a first monopole coherence value determined from monopole logging data and a first multipole coherence value determined from multipole logging data to determine a first mixed coherence value, the first monopole coherence value and the first multipole coherence value corresponding to a first shear slowness value;

combine a second monopole coherence value determined from the monopole logging data and a second multipole coherence value determined from the multipole logging data to determine a second mixed coherence value, the second monopole coherence value and the second multipole coherence value corresponding to a second shear slowness value; and use the first shear slowness value to represent shear slowness of a formation when the first mixed coherence value is greater than the second mixed coherence value, but instead use the second shear slowness value to represent the shear slowness of the formation when the second mixed coherence value is greater than the first mixed coherence value.

10. A tangible article of manufacture as defined in claim 9 wherein the machine readable instructions, when executed, further cause the machine to:

determine a standard deviation of the first monopole coherence value;

determine a standard deviation of the first multipole coherence value;

weight the first monopole coherence value by a first combination of the determined standard deviations of the first monopole and first multipole coherence values;

weight the first multipole coherence value by a second combination of the determined standard deviations of the first monopole and first multipole coherence values; and sum the weighted first monopole and first multipole coherence values to combine the first monopole and first multipole coherence values.

11. A tangible article of manufacture as defined in claim 9 wherein the machine readable instructions, when executed, further cause the machine to:

weight the first monopole coherence value by a first weight factor determined by evaluating a first weighting function at the first shear slowness value, the first weighting function being substantially equal to zero for shear slowness values greater than a mud slowness value or less than a scaled compressional slowness value;

weight the first multipole coherence value by a second weight factor determined by evaluating a second weighting function at the first possible shear slowness value, the second weighting function being substantially equal to zero for shear slowness values less than the scaled compressional slowness value; and combine the weighted monopole and weighted multipole coherence value.

12. A tangible article of manufacture as defined in claim 9 wherein the machine readable instructions, when executed, further cause the machine to:

backpropagate a set of receiver waveforms obtained from the monopole logging data using the first shear slowness value, the set of receiver waveforms corresponding respectively to a set of receivers used to obtain the monopole logging data; and process the backpropagated set of receiver waveforms to determine the first monopole coherence value.

13. A tangible article of manufacture as defined in claim 9 wherein the machine readable instructions, when executed, further cause the machine to:

backpropagate a set of receiver waveforms obtained from the multipole logging data using a dispersion model evaluated at the first shear slowness value, the set of receiver waveforms corresponding respectively to a set of receivers used to obtain the multipole logging data; and process the backpropagated set of receiver waveforms to determine the first multipole coherence value.

14. A tangible article of manufacture as defined in claim 9 wherein the first monopole coherence value and the first multipole coherence value correspond to a first pair of shear slowness and mud slowness values, wherein the second monopole coherence value and the second multipole coherence value correspond to a second pair of shear slowness and mud slowness values, and wherein the machine readable instructions, when executed, further cause the machine to:

use the shear slowness value from the first pair of shear slowness and mud slowness values to represent the shear slowness of the formation when the first mixed coherence value is greater than the second mixed coherence value; and use the shear slowness value from the second pair of shear slowness and mud slowness values to represent the shear slowness of the formation when the second mixed coherence value is greater than the first mixed coherence value.

15. An apparatus to determine shear slowness of a formation from acoustic logging data, the apparatus comprising:

a logging measurement collector to communicatively couple to a logging while drilling tool to obtain monopole logging data and multipole logging data corresponding to a measured formation;

a coherence combiner to combine a monopole coherence value determined from the monopole logging data for a particular formation parameter combination and a multipole coherence value determined from the multipole logging data for the particular formation parameter combination to determine a mixed coherence value for the particular formation parameter combination, the particular formation parameter combination including a particular shear slowness value; and a combined coherence maximizer to identify a maximum mixed coherence value from a plurality of mixed coherence values determined by the coherence combiner for a respective plurality of formation parameter combinations, the combined coherence maximizer to provide a shear slowness measurement output substantially equal to the particular shear slowness value included in the particular combination of formation parameters corresponding to the identified maximum mixed coherence value.

16. An apparatus as defined in claim 15 further comprising:

a variance determination unit to determine a variance of each monopole coherence value determined from the monopole logging data and each multipole coherence value determined from the multipole logging data; and a weight determination unit to determine a weight factor for each monopole coherence value and for each multipole coherence value, the weight factors to exclude coherence values corresponding to formation parameter combinations that are not physically realizable, the coherence combiner to combine monopole and multipole coherence values using the variances determined by the variance determination unit and the weights determined by the weight determination unit.

17. An apparatus as defined in claim 15 further comprising a monopole coherence determination unit to determine each monopole coherence value by:

backpropagating a set of receiver waveforms obtained from the monopole logging data using the particular shear slowness value corresponding to the monopole coherence value being determined, the set of receiver waveforms corresponding respectively to a set of receivers included in the logging while drilling tool; and processing the backpropagated set of receiver waveforms to determine the monopole coherence value corresponding to the particular shear slowness value.

18. An apparatus as defined in claim 15 further comprising a multipole coherence determination unit to determine each multipole coherence value by:

backpropagating a set of receiver waveforms obtained from the multipole logging data using a dispersion model evaluated at the particular shear slowness value and a particular mud slowness value corresponding to the multipole coherence value being determined, the set of receiver waveforms corresponding respectively to a set of receivers included in the logging while drilling tool; and processing the backpropagated set of receiver waveforms to determine the multipole coherence value corresponding to the particular shear slowness value and mud slowness value.

19. An apparatus as defined in claim 18 further comprising:

a dispersion modeling unit to implement the dispersion model for a set of fixed formation parameters to be used by the dispersion model, the set of fixed formation parameters not including shear slowness or mud slowness parameters, and a set of variable formation parameters including shear slowness and mud slowness parameters; and a control interface unit to specify at least one of a type of dispersion model to be implemented by the dispersion modeling unit or at least one of the fixed formation parameters.

* * * * *